United States Patent [19]

Swartz et al.

[11] Patent Number: 5,198,269
[45] Date of Patent: Mar. 30, 1993

[54] PROCESS FOR MAKING SOL-GEL DEPOSITED FERROELECTRIC THIN FILMS INSENSITIVE TO THEIR SUBSTRATES

[75] Inventors: Scott L. Swartz, Dublin; Peter J. Melling, Worthington, both of Ohio

[73] Assignee: Battelle Memorial Institute, Columbus, Ohio

[21] Appl. No.: 399,724

[22] Filed: Aug. 28, 1989

Related U.S. Application Data

[63] Continuation-in-part of Ser. No. 342,272, Apr. 24, 1989, abandoned.

[51] Int. Cl.$^5$ .............................. B05D 3/02
[52] U.S. Cl. ........................ 427/226; 427/126.2; 427/126.3; 427/419.3; 427/419.2; 427/379; 427/380
[58] Field of Search ............... 427/419.3, 126.2, 126.3, 427/100, 62, 63, 226, 419.2, 379, 380; 505/734, 735

[56] References Cited

U.S. PATENT DOCUMENTS

| | | | |
|---|---|---|---|
| 4,056,654 | 11/1977 | Kompanek | 428/409 |
| 4,255,208 | 3/1981 | Deutscher et al. | 148/175 |
| 4,561,916 | 12/1985 | Akiyama et al. | 148/175 |
| 4,615,913 | 10/1986 | Jones et al. | 427/226 |
| 4,626,369 | 12/1986 | Walker, Jr. | 252/62.9 |
| 4,649,627 | 3/1987 | Abernathey et al. | 29/571 |
| 4,664,946 | 3/1987 | Enomoto et al. | 427/126.2 |
| 4,759,823 | 7/1988 | Asselanis et al. | 156/659.1 |
| 4,789,421 | 12/1988 | Umeno et al. | 156/610 |
| 4,789,563 | 12/1988 | Stevens | 427/252 |
| 4,792,463 | 12/1988 | Okado et al. | 427/126.3 |
| 4,946,710 | 8/1990 | Miller et al. | 427/126.3 |
| 4,963,390 | 10/1990 | Lipetes et al. | 427/126.3 |
| 4,994,433 | 2/1991 | Chiang | 505/1 |

FOREIGN PATENT DOCUMENTS

| | | |
|---|---|---|
| 76314 | 6/1977 | Japan . |
| 176187 | 10/1983 | Japan . |
| 236404 | 11/1985 | Japan . |
| 63-256574 | 10/1988 | Japan . |
| 64-24085 | 1/1989 | Japan . |

OTHER PUBLICATIONS

The nature of the surface layers of ferroelectric films; Y. Y. Tomashpol'skii et al: Sov. Phys. Crystallogr.; 23, 5; Sep.–Oct. 1978; pp. 573–576.

(List continued on next page.)

Primary Examiner—Shrive Beck
Assistant Examiner—Roy V. King
Attorney, Agent, or Firm—Klaus H. Wiesmann

[57] ABSTRACT

A method for producing a thin film of a ferroelectric perovskite material having the steps of providing a first substrate; depositing a first layer of a sol-gel perovskite precursor material wherein the crystallization of this precursor material to the pervoskite phase is insensitive to the first substrate; depositing a second layer of a sol-gel perovskite precursor material wherein the crystallization is sensitive to the first substrate; and heat-treating the deposited layers to form ferroelectric perovskites. A heat treatment step to form perovskites may optionally follow the deposition of the first layer. The first layer of sol-gel perovskite precursor material is selected to produce a perovskite upon heat treatment of: lead titanate ($PbTiO_3$), or strontium titanate ($SrTiO_3$). The second layer of sol-gel perovskite precursor material is selected to produce a perovskite upon heat treatment of: lead zirconate titanate ($Pb(Zr,Ti)O_3$), lead zirconate ($PbZrO_3$), lead lanthanum titanate (($Pb,La)TiO_3$), lead lanthanum zirconate (($Pb,La)ZrO_3$), lead lanthanum zirconate titanate (($Pb,La)(Zr,Ti)O_3$), lead magnesium niobate ($Pb(Mg_{\frac{1}{3}}Nb_{\frac{2}{3}})O_3$), lead zinc niobate ($Pb(Zn_{\frac{1}{3}}Nb_{\frac{2}{3}})O_3$), barium titanate ($BaTiO_3$), strontium barium titanate (($Sr,Ba)TiO_3$), barium titanate zirconate ($Ba(Ti,Zr)O_3$), potassium niobate ($KNbO_3$), potassium tantalate ($KTaO_3$), or potassium tantalate niobate ($K(Ta,Nb)O_3$).

24 Claims, 20 Drawing Sheets

OTHER PUBLICATIONS

Ferroelectric Ceramics—The Sol–Gel Method Versus Conventional Processing; E. Wu et al; Mat. Res. Soc. Symp. Proc.; vol. 32; 1984; pp. 169–174.

Sol–Gel Processing of $PbTiO_3$, $PbZrO_3$, PZT and PLZT Thin Films; K. D. Budd, et al.; Br. Ceram. Proc.; No. 36; 1985; pp. 107–121.

Properties and microstructure of thin $LiNbO_3$ films prepared by a sol–gel process; D. P. Partlow et al; J. Mater. Res; 2(5); Sep./Oct. 1987; pp. 595–605.

Thin-Film Ferroelectrics of PZT by Sol–Gel Processing; S. K. Dey, et al.; IEEE Transactions on Ultrasonics, Ferroelectrics and Frequency Control; vol. 35, No. 1; Jan. 1988; pp. 80–81.

Preparation of $Pb(Zr,Ti)O_3$ thin films by sol–gel processing, Electrical, optical, and electro-optic properties; G. Yi et al; J. Appl. Phys.; 64, 5; Sep. 1, 1988; pp. 2717–2724.

Sol–Gel Processing of Lithium Niobate Thin-Layers on Silicon, D. J. Eichorst et al Mat. Res. Soc. Symp. Proc.; vol. 121; 1988; pp. 773–778.

Structure and Chemistry of Metal/Ceramic Interfaces; M. Ruhle et al; Mat. Sci. & Eng; A107; 1989; pp. 187–197.

Deposition from Solution of Thin Film Electroceramics; M. T. Goosey et al; British Ceramic Proceedings; No. 41; Feb. 1989; pp. 49–58.

Chemical Abstracts vol. 111:62844x, p. 312, 1989. Formation of thin ceramic layers on substrates.

Synthesis and Microstructure of Highly Oriented Lead Titanate Thin Films Prepared by a Sol–Gel Method; C. Chen et al; J. Am Ceram Soc; 72[8]; 1989; pp. 1495–1498.

PROCESS FOR MAKING SOL-GEL DEPOSITED FERROELECTRIC THIN FILMS INSENSITIVE TO THEIR SUBSTRATES

This is a continuation-in-part of copending application Ser. No. 07/342,272 filed on Apr. 24, 1989, now abandoned.

FIELD OF THE INVENTION

The present invention relates to a sol-gel method for producing crystalline thin films of perovskite compounds with better crystallinity and on a wider variety of substrates by deposition of an intermediate perovskite film (interlayer). The invention has utility in the manufacture of ferroelectric, dielectric, pyroelectric, piezoelectric, and electro-optic devices, such as nonvolatile semiconductor memories, thin-film capacitors, pyroelectric (IR) detectors, sensors, surface acoustic wave substrates, optical waveguides, optical memories, spatial light modulators, and frequency doublers for diode lasers.

BACKGROUND OF THE INVENTION

Thin films of ferroelectric materials are being investigated for a wide variety of electrical and optical applications. There are several reasons for the increasing importance of ferroelectric thin films:

The trend toward miniaturization of electronic components has led to the development of thin film ferroelectric devices performing the same electronic function with only a fraction of the volume of devices based on bulk ceramic or single-crystal elements.

Ferroelectric thin films are replacing expensive single crystal ferroelectrics. Thin films have added design advantages relative to single crystals: decreased volume and increased geometrical flexibility.

Applications are being identified that utilize new device concepts, exploiting properties that are unique to both thin films and ferroelectric materials.

Important ferroelectric materials for thin-film applications are typically titanates and niobates with oxygen-octahedral structure types, such as the perovskite structure. Examples of such ferroelectric perovskites include lead titanate ($PbTiO_3$), lead zirconate ($PbZrO_3$), lead zirconate titanate ($Pb(Zr,Ti)O_3$ or PZT), lead lanthanum titanate (($Pb,La)TiO_3$), lead lanthanum zirconate (($Pb,La)ZrO_3$), lead lanthanum zirconate titanate (($Pb,La)(Zr,Ti)O_3$ or PLZT), lead magnesium niobate ($Pb(Mg_{\frac{1}{3}}Nb_{\frac{2}{3}})O_3$), lead zinc niobate ($Pb(Zn_{\frac{1}{3}}Nb_{\frac{2}{3}})O_3$), strontium titanate ($SrTiO_3$), barium titanate ($BaTiO_3$), strontium barium titanate (($Sr,Ba)TiO_3$), barium titanate zirconate ($Ba(Ti,Zr)O_3$), potassium niobate ($KNbO_3$), potassium tantalate ($KTaO_3$), and potassium tantalate niobate ($K(Ta,Nb)O_3$). Device applications of ferroelectric thin films require that bulk ferroelectric properties are achieved in thin films. The physical and chemical properties of the film (density, uniformity, stoichiometry, crystal structure, and microstructure) are extremely important. The utilization of ferroelectric thin films for electronic and optical applications has been hindered by the lack of a large-scale production process for the deposition of device-quality ferroelectric thin-films.

SPUTTERING AND CVD METHODS

Physical vapor deposition (PVD) processes, such as sputtering, have been the most widely investigated of the deposition techniques for ferroelectric thin films. See for example: (1) K. Kushida and H. Takeuchi, Jpn. J. Appl. Phys., 24 (24-2), 407-40g (1985); (2) K. IIjima, et al., Jpn. J. Appl. Phys., 24 (24-2), 482-484 (1985); (3) M. Okuyama, et al., Jpn. J. Appl. Phys., 24 (24-2), 619-621 (1985); (4) S. B. Krupanidhi, et al., J. Appl. Phys., 54 (11), 6601-6609 (1983); (5) M. Adachi, et al., Jpn. J. Appl. Phys., 26 (4), 550-553 (1987); (6) K. Sreenivas and M. Sayer, J. Appl. Phys., 64 (3), 1484-1493 (1988); (7) T. Kawaguchi, et al., Appl. Optics, 23 (13), 2187-2191 (1984); (8) H. Higashino, et al., Jpn. J. Appl. Phys., 24 (24- 2), 284-286 (1985); and (9) H. Adachi, et al., J. Appl. Phys., 60 (2), 736-741 (1986). However, sputtering has not been entirely useful for thin-film ferroelectric applications, mainly because of the difficulties associated with control of the chemical and physical properties of the film (i.e., stoichiometry, crystal structure, microstructure, and uniformity over large areas). An additional limitation of sputtering is that it requires expensive and complicated equipment.

More recently, chemical vapor deposition (CVD) techniques have been applied to thin-film ferroelectrics. See for example: (10) M. KoJima, et al., Jpn. J. Appl. Phys. 22 (22-2), 14-17 (1983). The CVD method has excellent potential as a production method for device-quality ferroelectric thin films, especially when organo-metallic precursors are used. See for example: (11) S. L. Swartz, et al., Ferroelectrics 93, 37-43 (1989); and (12) B. S. Kwak, et al., Appl. Phys. Lett. 53 (18), 1702-1704 (1988). The CVD process can be extremely reproducible once conditions are established to produce a film with a particular composition and crystal structure. An additional advantage is that scale-up of a CVD process from the laboratory to production is typically not as difficult as it is for sputtering. A limitation to the use of CVD methods for ferroelectric thin-film applications is the difficulty associated with the control of stoichiometry of the complex compositions typical of ferroelectric materials.

SOL-GEL PROCESSING

Sol-gel processing is a relatively new method for the fabrication of ferroelectric thin films, and shows promise toward meeting the stringent quality requirements for device applications. In the sol-gel process, a non-aqueous solution of metal-organic (alkoxide) precursors is prepared with the metal cations in the desired stoichiometry, and controllably hydrolyzed with a solvent/water solution. A thin, adherent film of the hydrolyzed alkoxide solution (or "sol") is applied to a substrate by either dip-coating or spin-coating. The dried "gel" film is then densified by a heat treatment at relatively low temperatures. Advantages of the sol-gel process for thin films include:

- excellent homogeneity due to atomic-scale mixing of the alkoxide solution prior to hydrolysis;
- excellent control of composition and ease of compositional variations;
- densification at lower temperatures compared to conventional preparation of bulk material;
- film uniformity over large areas;
- simple and inexpensive equipment.

Most of the research into the sol-gel processing of ferroelectric thin films has been directed at the perovskite ferroelectrics, such as $PbTiO_3$, PZT, and PLZT. See for example: (13) K. D. Budd, et al., Br. Ceram. Proc., No. 36, 107-121 (1985); (14) K. D. Budd, et al., in *Better Ceramics Through Chemistry II*, edited by C. J. Brinker, D. E. Clark, and D. R. Ulrich (Mater Res. Soc. Proc. 73, Pittsburgh, Pa. 1986), pp. 711–716; (15) S. K. Dey, et al., IEEE Transactions on Ultrasonics, Ferroelectrics and Frequency Control 35 (1), 80–81 (1983); (16) R. A. Lipeles, et al., in *Better Ceramics Through Chemistry II*, edited by C. J. Brinker, D. E. Clark, and D. R. Ulrich (Mater Res. Soc. Proc. 73, Pittsburgh, Pa. 1986), pp. 665–670; and (17) G. Yi et al., J. Appl. Phys., 64 (5), 2717–2724 (1988). These studies have shown that fully-dense ferroelectric thin films with the desired composition and crystal structure can be produced with maximum processing temperatures as low as 500° C. The low processing temperatures are advantageous relative to stoichiometry control (minimizing the PbO volatility that occurs at higher temperatures) and to compatibility with a wider variety of substrates (including silicon, which is important for device applications). The sol-gel process can also be used for the fabrication of $LiNbO_3$ thin films. See for example: (18) D. P. Partlow and J. Greggi, J. Mater. Res. 2 (5), 595–605 (1987).

In addition, using a sol-gel technique, Yi, et al. (reference 17 above) have shown that the adhesion and clarity of sol-gel derived PZT thin films on borosilicate glass substrates can be improved by the use of a thin layer of alumina ($Al_2O_3$). The thin alumina layer reduced microcracking of the films, but did not enhance crystallinity of the PZT films.

The crystallization of sol-gel PZT, PLZT, and $KNbO_3$ thin films into the desired perovskite structure is extremely sensitive to the sol-gel processing conditions and to the nature of the substrate. This has limited the development of sol-gel processing for the fabrication of ferroelectric thin films. Conflicting results have appeared in the literature, where nominally identical sol-gel processing methods give contrasting results. A new fabrication method that enhances crystallization of sol-gel ferroelectric thin films and minimizes substrate effects is the subject of this invention.

BRIEF DESCRIPTION OF THE INVENTION

A general description of a first embodiment of the method illustrated by the examples includes a method for producing a thin film of a perovskite material comprising: Providing a substrate; depositing a first layer of a sol-gel perovskite precursor material wherein the crystallization of this precursor material to the perovskite phase is substantially insensitive to the substrate; heat treatment of this first layer to crystallize it into the perovskite structure: depositing a second layer of a sol-gel perovskite precursor material wherein the crystallization is sensitive to the substrate; and heat-treating the deposited layers to form a perovskite thin film. The first layer of sol-gel perovskite precursor material is selected to produce a perovskite of: lead titanate ($PbTiO_3$), or strontium titanate ($SrTiO_3$), and the second layer of sol-gel perovskite precursor material is selected to produce a perovskite: of lead zirconate titanate ($Pb(Zr,Ti)O_3$), lead zirconate ($PbZrO_3$), lead lanthanum titanate (($Pb,La)TiO_3$), lead lanthanum zirconate ($(Pb,La)ZrO_3$), lead lanthanum zirconate titanate (($Pb,La)(Zr,Ti)O_3$), lead magnesium niobate ($Pb(Mg_{\frac{1}{3}}Nb_{\frac{2}{3}})O_3$), lead zinc niobate ($Pb(Zn_{\frac{1}{3}}Nb_{\frac{2}{3}})O_3$), barium titanate ($BaTiO_3$), strontium barium titanate (($Sr,Ba)TiO_3$), barium titanate zirconate ($Ba(Ti,Zr)O_3$), potassium niobate ($KNbO_3$), potassium tantalate ($KTaO_3$), or potassium tantalate niobate ($K(Ta,Nb)O_3$). Due to the presence of the first layer, the second layer of sol-gel perovskite precursor material after heat treatment has better crystallinity when deposited on the first layer than if it would, have been deposited directly on the substrate and heat treated. Additionally, the second layer of sol-gel perovskite precursor material densifies and crystallizes into a perovskite structure at a lower temperature and/or with shorter times in the presence of the first layer.

A general description of the second embodiment of the method illustrated by the examples involves omitting the heat treatment step after deposition of the first deposited layer. The crystallization-insensitive and crystallization-sensitive materials for the first and second layer can be the same for both embodiments. The advantages of this embodiment are likewise realized such as better crystallinity and reaction at lower temperatures; however, the first embodiment is the preferred embodiment.

DETAILED DESCRIPTION OF THE INVENTION

Figure 1:
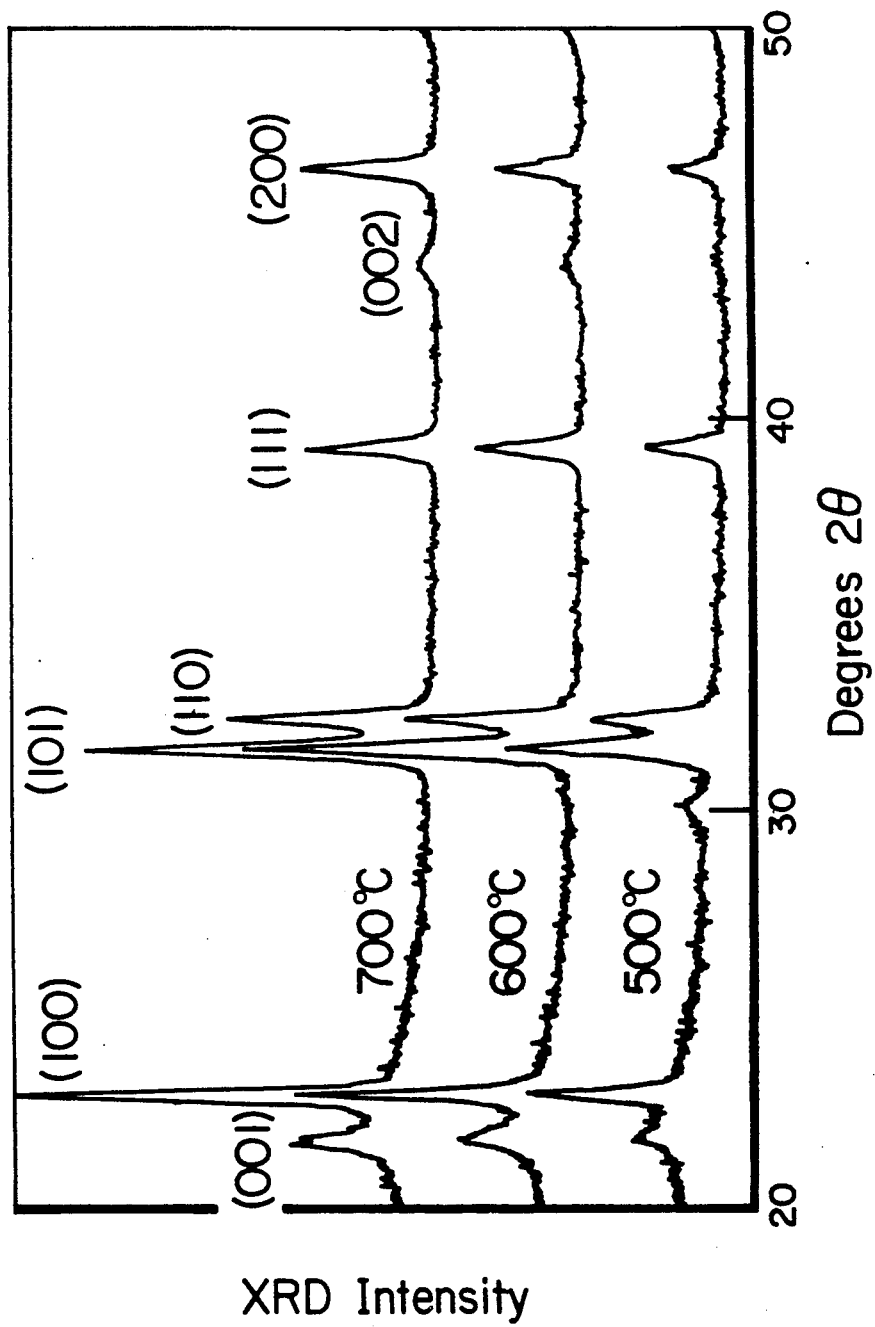
FIG. 1 shows x-ray diffraction patterns of sol-gel $PbTiO_3$ thin films deposited on fused silica substrates,, prepared according to Example 1, and annealed at temperatures 500°, 600°, and 700° C.

This invention relates to the use of sol-gel processing techniques to fabricate thin films of ferroelectric perovskite ceramics such as lead titanate (PbTiO$_3$), lead zirconate (PbZrO$_3$), lead zirconatetitanate (Pb(Zr,Ti)O$_3$ or PZT), lead lanthanum titanate ((Pb,La)TiO$_3$), lead-lanthanum zirconate ((Pb,La)ZrO$_3$), leadlanthanum zirconate titanate ((Pb,La)(Zr,Ti)O$_3$ or PLZT), lead magnesium niobate (Pb(Mg$_\frac{1}{3}$Nb$_\frac{2}{3}$)O$_3$), lead zinc niobate (PbZn($_\frac{1}{3}$Nb$_\frac{2}{3}$)O$_3$), strontium titanate (SrTiO$_3$), barium titanate (BaTiO$_3$), barium strontium titanate ((Ba,Sr)TiO$_3$), barium titanate zirconate (Ba(Ti,Zr)O$_3$), potassium niobate (KNbO$_3$), potassium tantalate (KTaO$_3$), and potassium tantalate niobate (K(Ta,Nb)O$_3$). Examples are provided for the fabrication of PbTiO$_3$, PZT, PLZT, and KNbO$_3$ thin films on fused silica (SiO$_2$), silicon (Si), Pt-coated silicon, alumina (Al$_2$O$_3$), sapphire (single crystal alumina), Pt-coated sapphire, and single crystal SrTiO$_3$ substrates.

The sol-gel method used for the fabrication of the PbTiO$_3$, PZT, and PLZT thin films is based on the methoxyethanol solvent system. For a more complete description of this process, see: (13) K. D. Budd, et al., Br. Ceram. Proc., No. 36, 107–121 (1985). Lead acetate hydrate was dissolved in methoxyethanol and the water was removed by distillation. Methoxyethanol solutions containing appropriate amounts of Ti-isopropoxide, Zr-propoxide, and La-isopropoxide were added to the Pb-acetate methoxyethanol solution, and the alkoxyacetate (ester) by-product was removed by distillation, resulting in a clear, brown solution. This complex alkoxide solution then was hydrolyzed by a methoxyethanol solution of water and HNO$_3$ in amounts corresponding to 1 to 3 moles of water and 0.1 to 0.3 moles of HNO$_3$ per mole of alkoxide; the final alkoxide concentration of the hydrolyzed solutions typically ranged from 0.15M to 0.25M. Thin films were deposited on various substrates by spin-coating at 1000 to 3000 rpm. The thickness of a single layer sol-gel film is between 500 and 2000 Å, depending on the alkoxide concentration of the coating solution and the speed (rpm) of the spin-coating operation. Multiple coatings are required for increased film thicknesses; the films are heated to between 300° and 600° C. for 5–10 minutes to volatize the organic species, prior to successive spin-coating operations. Finally, the films are annealed at temperatures between 500° and 800° C. for 0.25 to two hours to promote densification and crystallization.

The sol-gel solutions used for the deposition of SrTiO$_3$ thin films were prepared by the following method. First, strontium metal was dissolved in methoxyethanol in a three-neck flask under a blanket of argon; this solution was stirred for two hours to insure complete reaction. An appropriate amount of titanium isopropoxide then was added to the Sr-methoxyethoxide solution, and the solution was stirred for an additional thirty minutes. A portion of the methoxyethanol solvent was removed by distillation. The Sr-Ti methoxyethoxide solution then was hydrolyzed, and the films deposited by multiple spin-coating and annealing operations. These latter thin-film processing steps (hydrolysis, spin-coating, and annealing) were similar to those described above for the PbTiO$_3$, PZT, and PLZT thin films.

The sol-gel solutions used for the deposition of KNbO$_3$ thin films were prepared by the reaction between potassium methoxyethoxide and niobium ethoxide in methoxyethanol. The potassium methoxyethoxide solution was prepared by dissolving potassium metal in methoxyethanol at 0° C. under an argon blanket. Niobium ethoxide was alcohol exchanged by refluxing in methoxyethanol, followed by distillation to remove the ethanol. The potassium and niobium alkoxide solutions were then mixed and refluxed to yield a clear, golden-yellow solution of the complex alkoxide (most likely, potassium niobium methoxyethoxide). The subsequent thin-film processing steps (hydrolysis, spin-coating, and annealing) were similar to those described above for the PbTiO$_3$, PZT, and PLZT thin films.

In the course of this investigation, it was found that the crystallization of the perovskite phase in sol-gel thin films of PZT, PLZT, and KNbO$_3$ (during annealing) was sensitive on the nature of the substrate. Conversely, the crystallization of perovskite PbTiO$_3$ and SrTiO$_3$ thin films was relatively insensitive to the substrate. For instance, sol-gel PbTiO$_3$ thin films crystallized into the perovskite structure on fused silica, silicon, Pt-coated silicon, alumina, sapphire, and Pt-coated sapphire substrates, given a sufficient thickness (at least two spin-coating depositions). However, similarly prepared sol-gel thin films of PZT (20/80) were amorphous after annealing, when deposited on fused silica and silicon substrates, but crystallized into the perovskite structure on alumina substrates. The same sol-gel PZT (20/80) films crystallized epitaxially on a single crystal SrTiO$_3$ substrate. Similarly, sol-gel KNbO$_3$ films crystallized into several non-perovskite phases when deposited on fused silica, silicon, or alumina substrates; epitaxial crystallization of KNbO$_3$ again was observed on single crystal SrTiO$_3$. Additional research confirmed that the crystallization of sol-gel SrTiO$_3$ thin films was relatively substrate-insensitive, whereas the crystallization of sol-gel thin films of PZT (40/60), PZT (53/47), and PLZT (9/65/35) was sensitive to the substrate material.

The utilization of sol-gel processing for the fabrication of ferroelectric thin films for device applications will be limited unless these substrate effects can be minimized. One approach toward minimizing these substrate effects is the subject of this invention. The crystallization of sol-gel PbTiO$_3$ thin films on a wide variety of substrates and the epitaxial crystallization of substrate-sensitive ferroelectric thin films of PZT and KNbO$_3$ on single crystal SrTiO$_3$ (i.e., a material with the same perovskite structure of PZT and KNbO$_3$), led to this invention. It has been demonstrated, as shown in the examples, that the crystallization of substrate-sensitive perovskite thin-film ferroelectric materials such as PZT, PLZT, and KNbO$_3$ is possible on a wider variety of substrates when an intermediate thin film of an isostructural and substrate-insensitive perovskite (such as PbTiO$_3$ or SrTiO$_3$) first is deposited on the substrate as an interlayer between the substrate and the substrate-sensitive film (e.g., PZT, PLZT, or KNbO$_3$). The crystallization of the substrate-sensitive perovskite ferroelectric thin film is facilitated on the isostructural (perovskite) interlayer film. Thus, the use of a perovskite interlayer film allows the use of a wider variety of substrates. This invention has been demonstrated for the deposition of perovskite thin films of PZT and PLZT on fused silica, silicon, Pt-coated silicon, sapphire and platinum-coated sapphire substrates, and for KNbO$_3$ thin films on alumina substrates, using interlayer films of PbTiO$_3$ and SrTiO$_3$. However, this invention is applicable to a wider variety of substrates (e.g., gallium arsenide, and substrates that are coated with electrode materials such as gold, indium tin oxide, F-doped tin oxide, or any other conductive material). This invention also is applicable to a wider variety of ferroelectric thin-film materials (e.g., PbZrO$_3$, (Pb,La)TiO$_3$, (Pb,La)ZrO$_3$, Pb(Mg$_{\frac{1}{3}}$Nb$_{\frac{2}{3}}$)O$_3$, Pb(Zn$_{\frac{1}{3}}$Nb$_{\frac{2}{3}}$)O$_3$, BaTiO$_3$, (Ba,Sr)TiO$_3$, Ba(Ti,Zr)O$_3$, KTaO$_3$, and K(Ta,Nb)O$_3$). This invention will also have utility in improving the crystallinity and/or reducing the annealing times of ferroelectric thin films, even when the interlayer is not required for crystallization of the perovskite phase. For instance, it has been reported by Budd et al. (reference 13), that sol-gel derived PZT thin films require higher temperatures for crystallization into the perovskite structure than do sol-gel derived PbTiO$_3$ thin films. The use of a PbTiO$_3$ interlayer can reduce the crystallization temperature required for the crystallization of sol-gel PZT thin films. Novel ferroelectric thin film devices also can be fabricated through the practice of this invention. For instance:

It is possible to prepare ferroelectric films of complex compositions by first depositing an interlayer of one composition that is a constituent of the desired film composition and then deposit the film with the composition adjusted to account for the composition of the interlayer. For example, PLZT thin films for application in electro-optic devices can be prepared by using a PbTiO$_3$ interlayer and a (Pb,La)ZrO$_3$ film, resulting in a film with the desired PLZT composition after annealing. A second example of this concept would be a (Ba,Sr)TiO$_3$ film for pyroelectric applications prepared with a SrTiO$_3$ film and a BaTiO$_3$ film, resulting in a film with the desired (Ba,Sr)TiO$_3$ composition after annealing.

Ferroelectric thin films with compositional gradients can be produced, e.g., a PLZT film with the PLZT composition changing from PbTiO$_3$ at the substrate interface to PLZT at the surface of the film, with varying composition throughout the thickness of the film. Such a film would have a gradient index of refraction and would have utility in optical waveguide devices. An example of this concept would be a (Ba,Sr)TiO$_3$ film with varying Ba/Sr stoichiometry throughout the thickness of the film. Such a film would have utility in pyroelectric detectors.

Highly oriented ferroelectric films can be produced. Examples are provided for oriented PZT and PLZT thin films on sapphire and platinum-coated sapphire substrates. Oriented thin films of other ferroelectric materials (such as KNbO$_3$ and K(Ta,Nb)O$_3$) can be produced with this method. Oriented ferroelectric thin films would have utility for a wide variety of electro-optic devices, such as optical waveguides, modulators, and frequency doublers for diode lasers.

As used in the discussion herein each deposition of sol-gel material will be termed a coat. A layer comprises one or more coats of an identical material while a film may comprise one or more coats or one or more layers. The first layer adjacent to the substrate is also termed an interlayer.

The Table provides a listing of results obtained from the examples below.

TABLE

| Ex. | First Layer (Interlayer) | Second Layer (Film) | Substrate | Crystalline phases |
|---|---|---|---|---|
| 1 a | None | PbTiO$_3$ | Silica | Perovskite |
| b | None | PbTiO$_3$ | Silicon | Perovskite |
| c | None | PbTiO$_3$ | Alumina | Perovskite |
| 2 a | None | SrTiO$_3$ | Silica | Perovskite |
| b | None | SrTiO$_3$ | Silicon | Perovskite |

TABLE-continued

| Ex. | First Layer (Interlayer) | Second Layer (Film) | Substrate | Crystalline phases |
|---|---|---|---|---|
| c | None | SrTiO$_3$ | Aluminia | Perovskite |
| 3 a | None | PZT (20/80) | Silica | Amorphous |
| b | None | PZT (20/80) | Silicon | Amorphous |
| c | None | PZT (20/80) | Alumina | Perovskite |
| d | None | PZT (20/80) | SrTiO$_3$ | Epitaxial, Perovskite |
| 4 a | None | KNbO$_3$ | Silicon | Non-perovskite phases |
| b | None | KNbO$_3$ | Alumina | Non-perovskite phases |
| c | None | KNbO$_3$ | SrTiO$_3$ | Epitaxial, Perovskite |
| 5 a | PbTiO$_3$ | PZT (40/60) | Silicon | Perovskite |
| b | None | PZT (40/60) | Silicon | Amorphous |
| 6 a | PbTiO$_3$ | PZT (40/60) | Silicon | Perovskite |
| b | PbTiO$_3$ | PZT (40/60) | Pt/Silicon | Perovskite |
| 8 a | PbTiO$_3$ | PZT (53/47) | Silica | Perovskite |
| b | None | PZT (53/47) | Silica | Amorphous |
| 9 a | PbTiO$_3$ | PZT (53/47) | Sapphire | Oriented, Perovskite |
| b | None | PZT (53/47) | Sapphire | Perovskite |
| 10 a | PbTiO$_3$ | PLZT (9/65/35) | Silica | Perovskite |
| b | None | PLZT (9/65/35) | Silica | Amorphous |
| 11 a | PbTiO$_3$ | PLZT (9/65/35) | Silica | Perovskite |
| b | None | PLZT (9/65/35) | Silica | Amorphous |
| 12 a | PbTiO$_3$ | PLZT (9/65/35) | Sapphire | Oriented, Perovskite |
| b | None | PLZT (9/65/35) | Sapphire | Amorphous, Perovskite |
| 13 | PbTiO$_3$ | PLZT (9/65/35) | Pt/Silicon | Perovskite |
| 14 | PbTiO$_3$ | PLZT (9/65/35) | Pt/Sapphire | Oriented, Perovskite |
| 15 | SrTiO$_3$ | PLZT (9/65/35) | Pt/Silicon | Perovskite |
| 16 | PbTiO$_3$ | KNbO$_3$ | Alumina | Perovskite |
| 17 | SrTiO$_3$ | KNbO$_3$ | Alumina | Perovskite |

EXAMPLES 1a, b, and c

In this example, the preparation of sol-gel PbTiO$_3$ thin films is described. Lead-acetate hydrate (37.9 grams or 0.1 moles) was dissolved in 110 ml of methoxyethanol in a heated three-neck flask. This solution was distilled at 110° C. under argon to remove the water. The solution was cooled to 60° C., and 29.8 ml (0.1 moles) of Ti-isopropoxide was added to the lead-acetate methoxyethanol solution. The solution was distilled at 115° C. to remove an acetyl-alkoxide (ester) by-product; 100 ml of methoxyethanol was added and the distillation was repeated until the volume was reduced to 131 ml (corresponding to a PbTiO$_3$ concentration of 0.76 M). The resulting complex Pb-Ti alkoxide solution then was cooled to room temperature. A 25-ml portion was hydrolyzed by the addition of a methoxyethanol solution containing water and HNO$_3$ in amounts corresponding to 3:1 and 0.1:1 ratios of water and HNO$_3$ per mole of PbTiO$_3$. The final PbTiO$_3$ concentration of the hydrolyzed solution was 0.20 M. The hydrolyzed Pb-Ti alkoxide solution was stirred for 30 minutes prior to spin-coating.

Figure 2A:
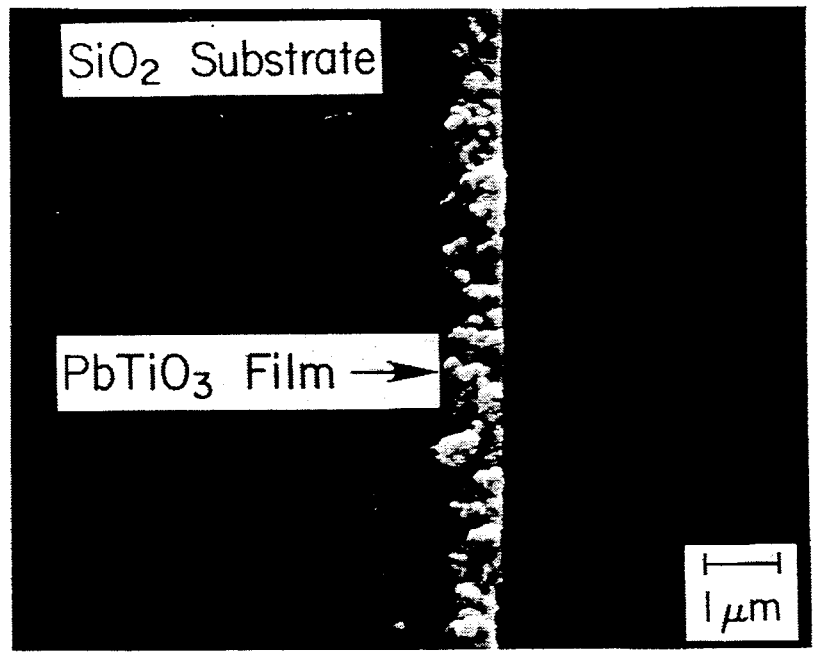
FIG. 2 shows SEM micrographs of (a) the cross-section and (b) the top surface of a sol-gel $PbTiO_3$ thin film deposited on a fused silica substrate, and annealed at 500° C., according to Example 1.
Figure 2B:
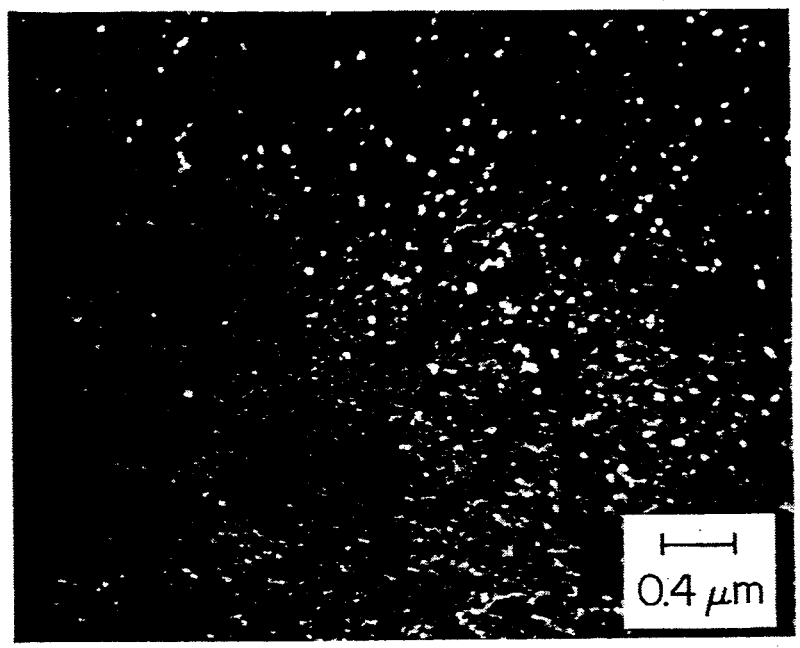

Sol-gel PbTiO$_3$ films were deposited on fused silica (Example 1a), silicon (Example 1b), and alumina (Example 1c) substrates by spin-coating at 1000 rpm. A total of four coats were applied with heat treatments at 300° C. after each spin-coating deposition. After the fourth coat, the sol-gel PbTiO$_3$ thin films were annealed at temperatures between 450° and 800° C. for thirty minutes. Single-layer PbTiO$_3$ films were amorphous after annealing, but films with two or more layers were crystalline with the desired tetragonal perovskite structure after thermal annealing at temperatures of 500° C. and above. X-ray diffraction patterns of four-layer PbTiO$_3$ films deposited on fused silica and annealed at 500°, 600°, and 700° C. for thirty minutes are compared in FIG. 1. The XRD patterns indicated that single-phase perovskite PbTiO$_3$ was present in the films heat treated at all three temperatures (except for a minor amount of PbO in the film annealed at 500° C). Scanning electron microscopy (FIG. 2) indicated that the four-layer PbTiO$_3$ films were about 7000 Å thick and that the grain size increased from about 0.05 to 0.2 microns as the annealing temperature was increased from 500° to 700° C. PbTiO$_3$ thin films deposited on silicon, platinum-coated silicon, alumina, and platinum-coated alumina also crystallized into the desired perovskite structure during annealing, suggesting the crystallization of sol-gel PbTiO$_3$ thin films is relatively substrate-insensitive.

EXAMPLES 2a, b, and c

In this example, the preparation of sol-gel SrTiO$_3$ thin films is described. Strontium metal (5.50 grams, 0.063 moles) was dissolved in 400 ml of methoxyethanol in a heated three-neck flask, under a blanket of argon. After this solution was stirred for two hours, 18.8 ml (0.063 moles) of titanium isopropoxide was added, and the solution was stirred for an additional thirty minutes. The solution was distilled at 110° C. until the volume was reduced to 197 ml (corresponding to a SrTiO$_3$ concentration of 0.32 M). The resulting complex Sr-Ti methoxyethoxide solution was cooled to room temperature, and stored under argon. A 25-ml portion was hydrolyzed by the addition of a methoxyethanol solution containing an amount of water equivalent to a 2:1 mole ratio of water to SrTiO$_3$. The final SrTiO$_3$ concentration of the hydrolyzed alkoxide solution was 0.16 M. The solution was stirred for 30 minutes prior to spin-coating.

Figure 3:
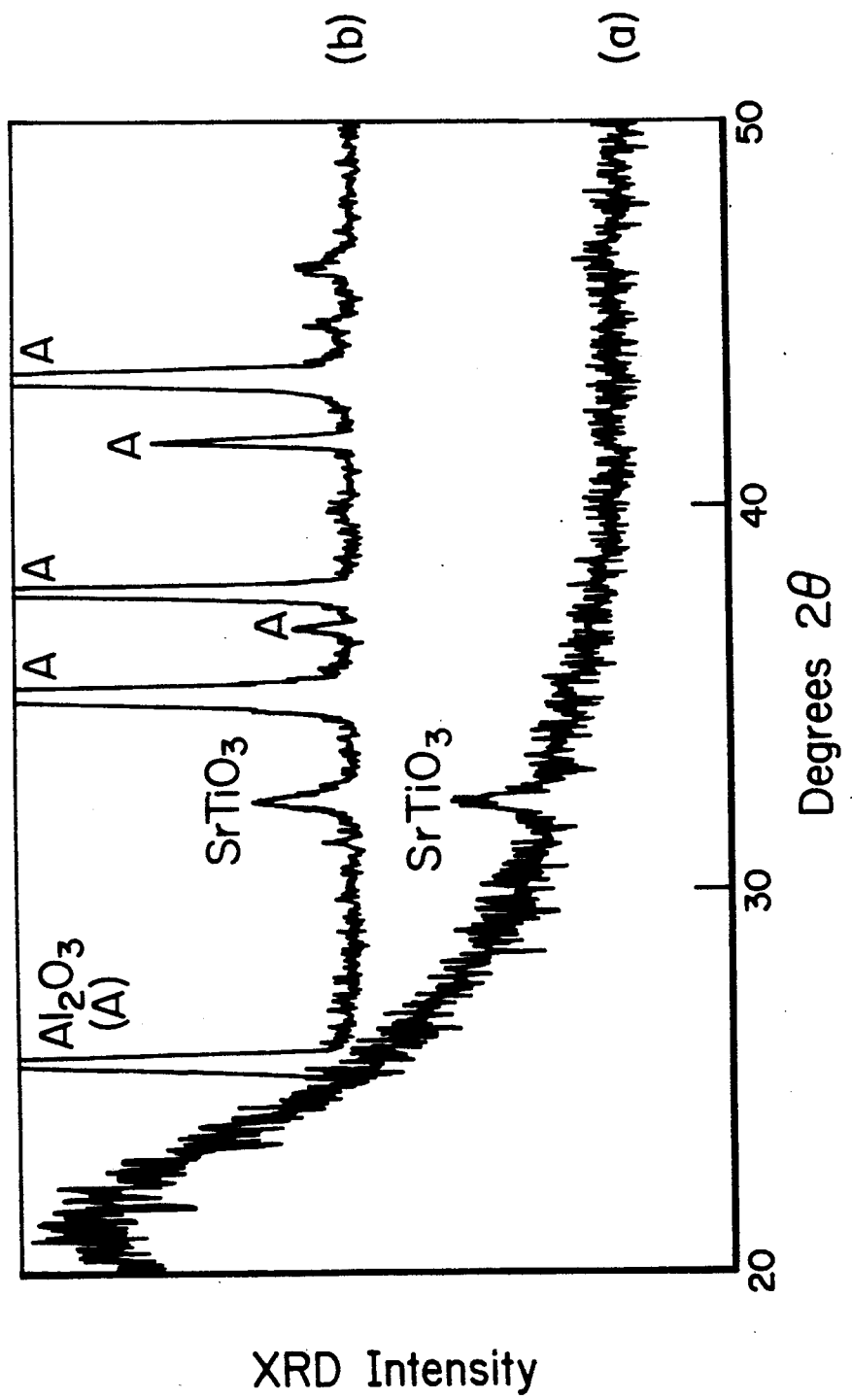
FIG. 3 shows x-ray diffraction patterns of sol-gel $SrTiO_3$ thin films on fused silica and alumina substrates, and annealed at 700° C., according to Example 2.

Sol-gel SrTiO$_3$ films were deposited on fused silica (Example 2a), silicon (Example 2b), and alumina (Example 2c) substrates by spin-coating at 1500 rpm. A total of four coats were applied with heat treatments at 400° C. after each spin-coating deposition. After the fourth coat, the sol-gel SrTiO$_3$ thin films were annealed at temperatures between 600° and 850° C. for thirty minutes. X-ray diffraction patterns of four-layer SrTiO$_3$ films deposited on fused silica and alumina substrates and annealed at 700° C. for thirty minutes are compared in FIG. 3. X-ray diffraction confirmed that sol-gel $SrTiO_3$ films with two or more layers, deposited on fused silica, silicon, and alumina substrates, were crystalline with the desired perovskite structure after annealing at temperatures of 600 C and above.

EXAMPLES 3a, b, c, and d

In this example, the crystallization of sol-gel PZT (20/80) $(Pb(Zr_{0.20}Ti_{0.80})O_3$ thin films, on fused silica (Example 3a), silicon (Example 3b), alumina (Example 3c), and single crystal strontium titanate (Example 3d) substrates, is described. The preparation of the hydrolyzed alkoxide solution was similar to that of Example 1. Lead-acetate hydrate (37.9 grams or 0.1 moles) was dissolved in 100 ml of methoxyethanol in a heated three-neck flask. This solution was distilled at 110° C. to remove the water. The solution was cooled to 60° C., and 23.8 ml of Ti-isopropoxide (0.08 moles) and 6.24 ml (0.02 moles) of Zr-propoxide were added to the lead-acetate methoxyethanol solution. The solution was distilled at 115° C. to remove an acetyl-alkoxide (ester) by-product; 100 ml of methoxyethanol was added, and the distillation was repeated until the volume was reduced to 150 ml (corresponding to a PZT concentration of 0.67M). The resulting complex Pb-Ti-Zr methoxyethoxide solution was cooled to room temperature. A 25-ml portion then was hydrolyzed with a methoxyethanol solution containing water and $HNO_3$ in amounts corresponding to 2.5:1 and 0.15:1 ratios of water and $HNO_3$ per mole of PZT. The final PZT concentration of the hydrolyzed solution was 0.18M. The hydrolyzed Pb-Zr-Ti alkoxide solution was stirred for 30 minutes prior to spin-coating.

Figure 4A:
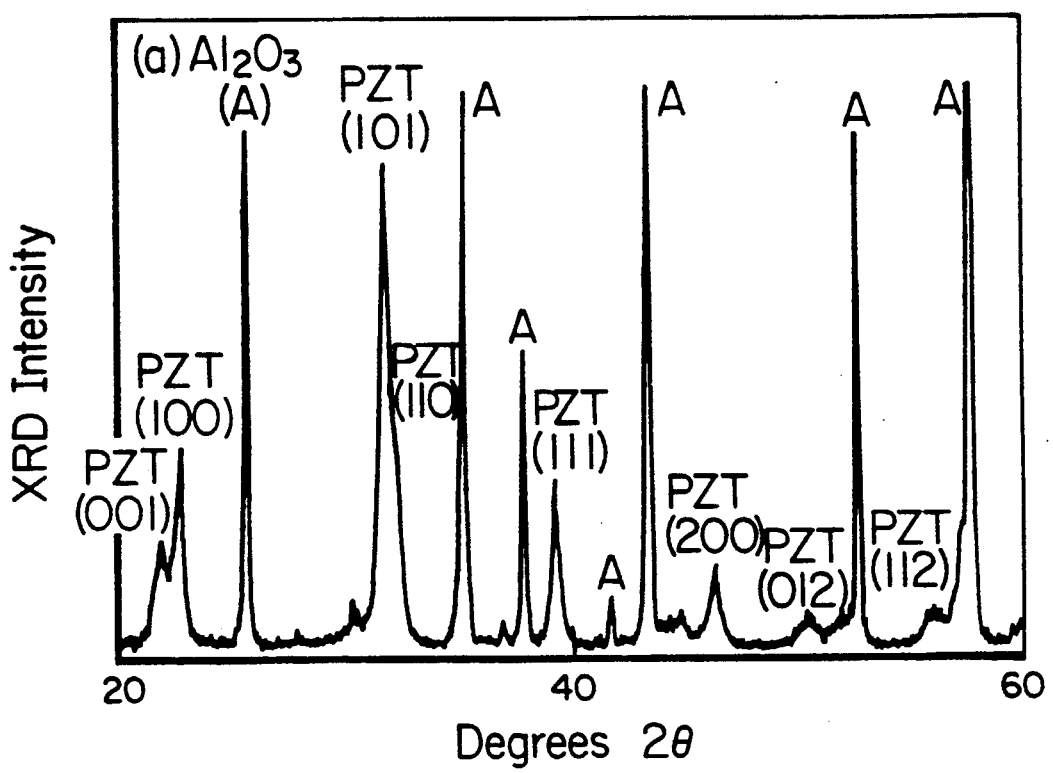
FIG. 4 shows x-ray diffraction patterns of sol-gel PZT (20/80) films deposited on (a) alumina and (b) single crystal (210) $SrTiO_3$, and annealed at 700° C., according to Example 3.
Figure 4B:
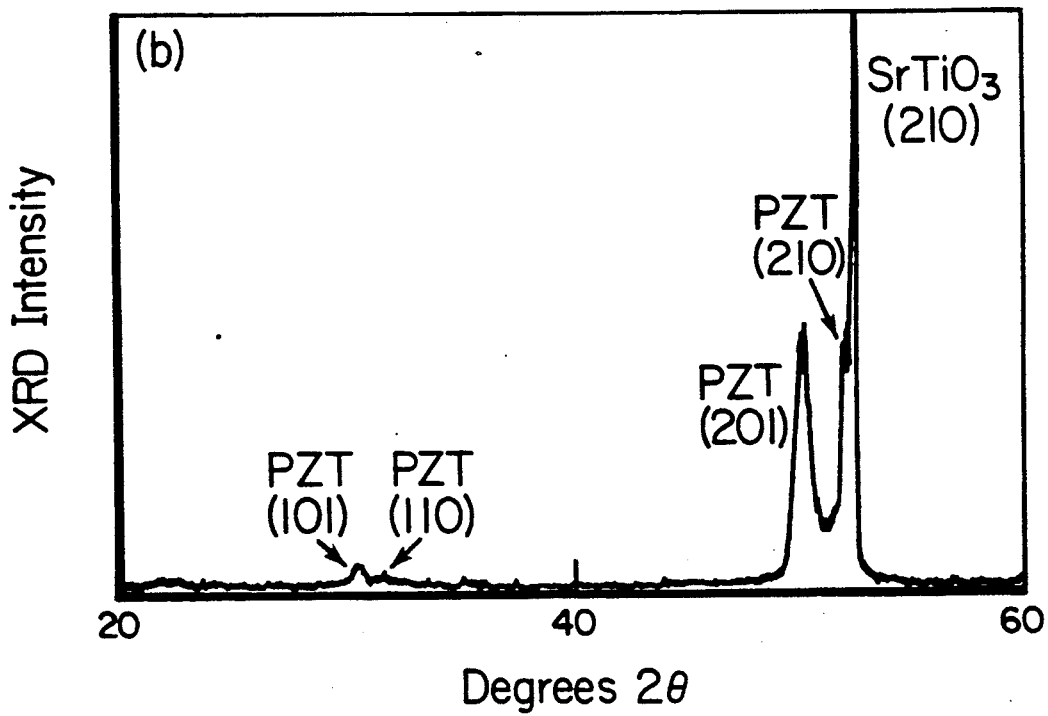

Thin films were deposited from a 0.18M hydrolyzed Pb-Ti alkoxide solution by multiple spin-coating depositions (with intermediate 300° C. heat treatments) on fused silica, silicon, alumina, and single crystal $SrTiO_3$ substrates. In contrast to the $PbTiO_3$ films, the crystallization of the perovskite phase in sol-gel PZT films was substrate-sensitive. X-ray diffraction indicated that six-layer sol-gel PZT films deposited on fused silica and silicon substrates were amorphous after annealing at temperatures up to 800° C. However, perovskite PZT did crystallize in six-layer sol-gel films deposited on alumina substrates and annealed at 700° C. for thirty minutes (FIG. 4a), and epitaxial crystallization of perovskite PZT was observed in a six-layer sol-gel film deposited on single crystal (210) $SrTiO_3$ and annealed at 700° C. for thirty minutes (FIG. 4b). The (210) and (201) XRD peaks of PZT (at d-spacings of 1.820 and 1.761 respectively) were the dominant PZT peaks in the XRD pattern. Other PZT peaks at d-spacings of 4.126 Å (001), 3.962 Å (100), and 2.841 Å (110), also were detected, along with the (210) peak corresponding to the $SrTiO_3$ substrate.

EXAMPLES 4a, b, and c

In this example, a similar and more pronounced substrate sensitivity is described for the crystallization of sol-gel $KNbO_3$ films. The K-Nb alkoxide solution for the deposition of $KNbO_3$ thin films was prepared by mixing methoxyethanol solutions of K-methoxyethoxide and Nb-methoxyethoxide. The K-methoxyethoxide solution was prepared by dissolving 3.07 grams (0.079 moles) of potassium metal in 200 ml of methoxyethanol at 0° C. in a 500-ml three-neck flask under an argon blanket. The Nb-methoxyethoxide solution was prepared by dissolving 25 grams (0.079 moles) of niobium ethoxide in 200 ml of methoxyethanol. The Nb-ethoxide solution was refluxed, and then distilled at 110° C. to remove the ethanol. The potassium and niobium alkoxide solutions were combined at 90° C., and refluxed to yield a clear, golden-yellow solution of the complex alkoxide (most likely, K-Nb methoxyethoxide). The K-Nb alkoxide solution then was distilled at 110° C. until the volume was reduced to 150 ml (corresponding to a $KNbO_3$ concentration of 0.52 M). A 7.5-ml portion was hydrolyzed with a methoxyethanol solution containing an amount of water equivalent to a 0.6:1 ratio of water per mole of $KNbO_3$. The final $KNbO_3$ concentration of the hydrolyzed alkoxide solution was 0.30 M.

Figure 5:
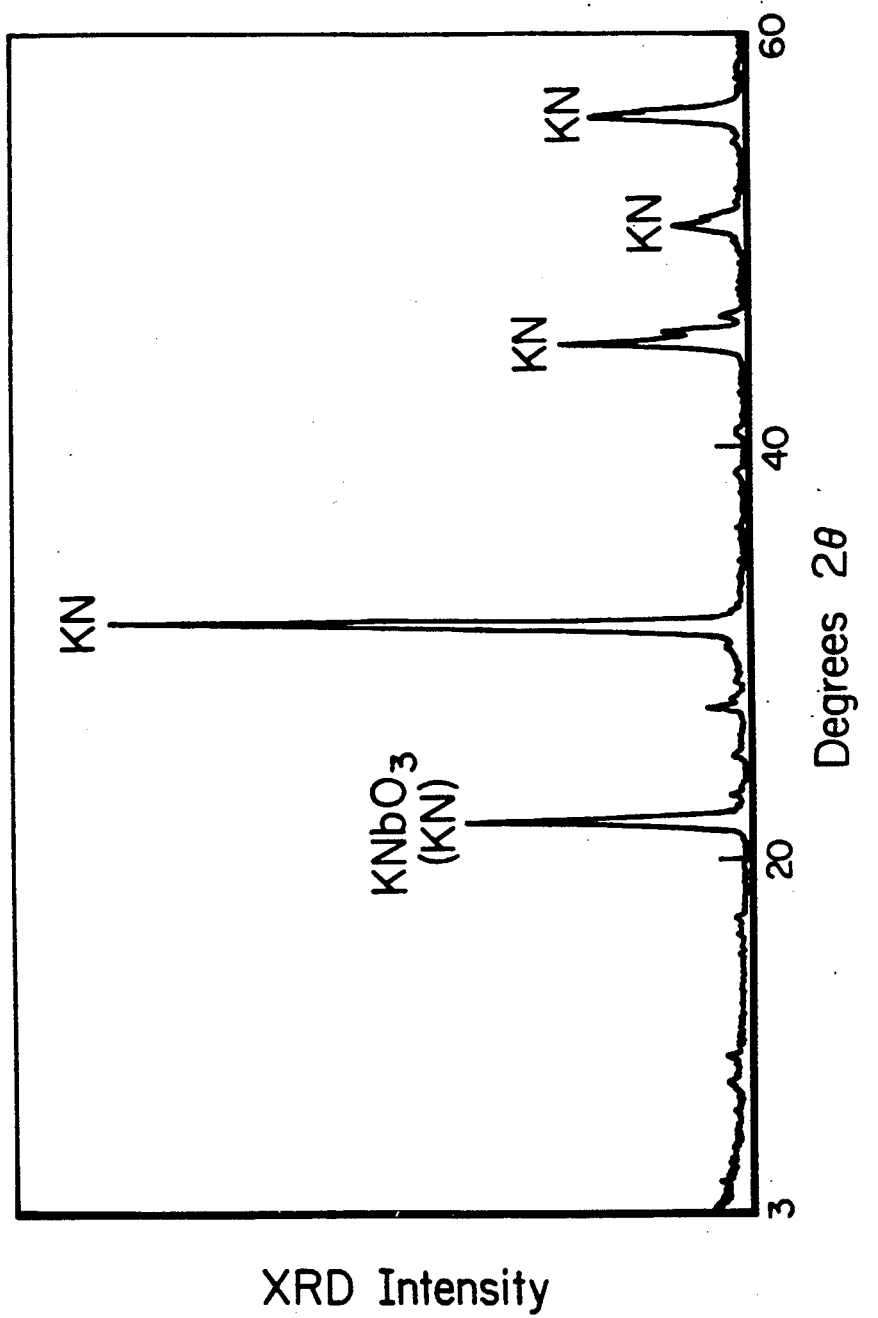
FIG. 5 shows an x-ray diffraction pattern of calcined $KNbO_3$ powder, prepared from the K-Nb alkoxide solution, according to Example 4.
Figure 6A:
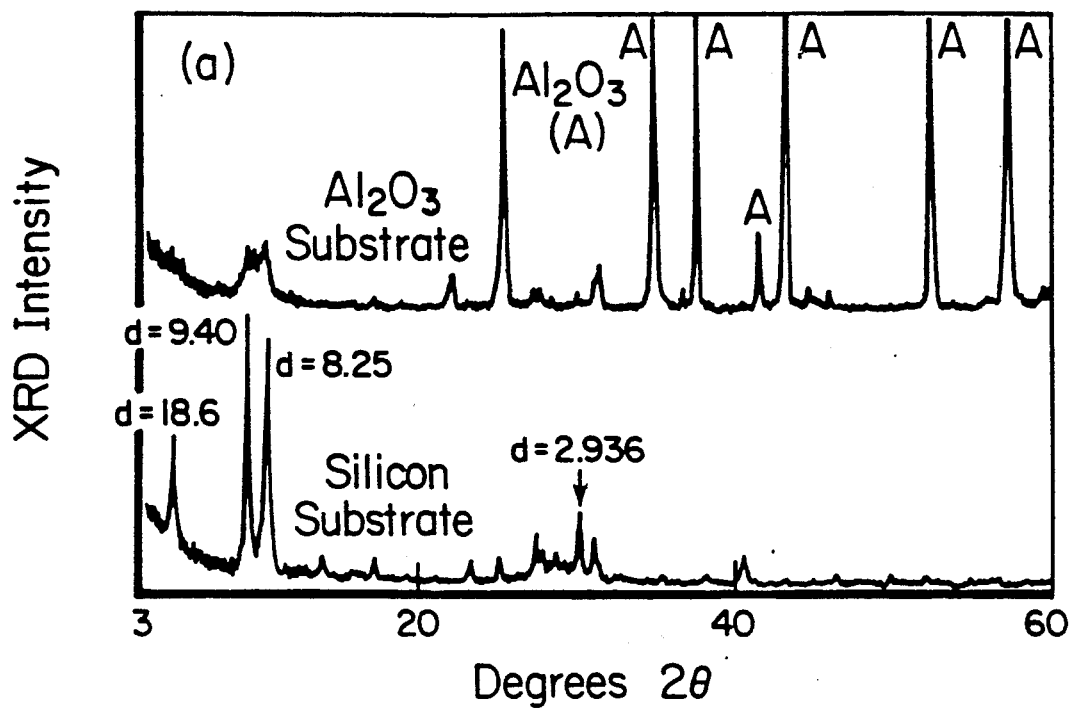
FIG. 6 shows x-ray diffraction patterns of sol-gel $KNbO_3$ thin films deposited on (a) silicon and alumina substrates and (b) single crystal (210) $SrTiO_3$, and annealed at 700° C., according to Example 4.
Figure 6B:
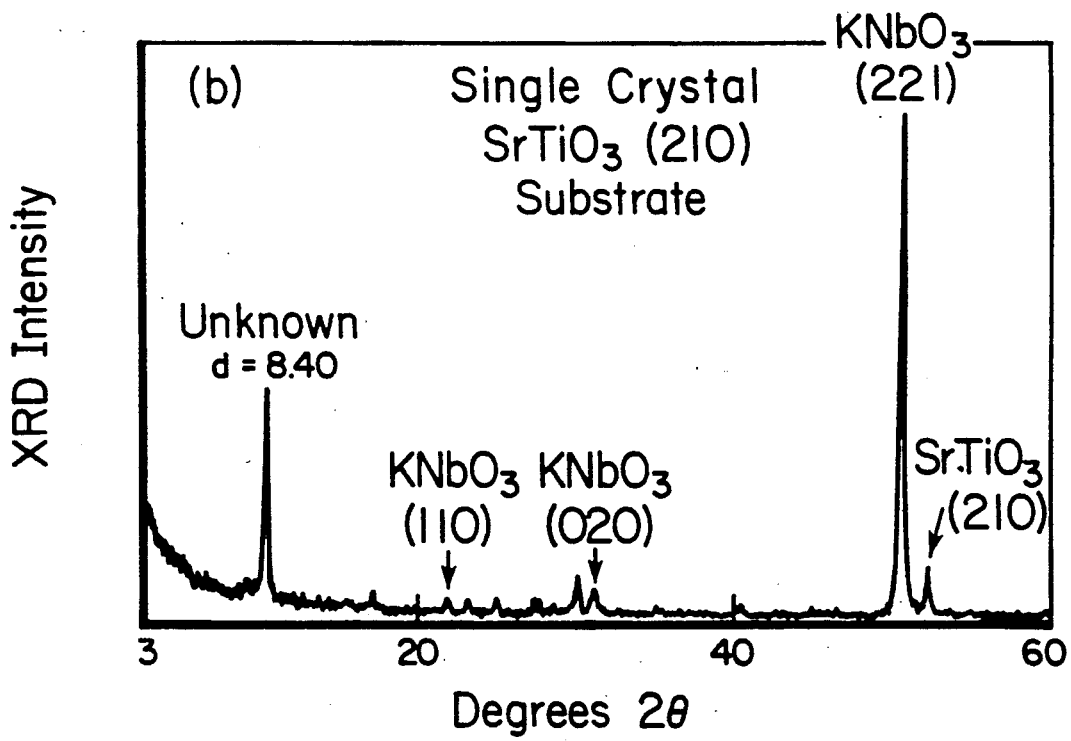

A small portion of the hydrolyzed alkoxide solution was dried and calcined at 800° C. This calcined material gave an XRD pattern (FIG. 5) indicative of single-phase (orthorhombic) perovskite $KNbO_3$. Sol-gel $KNbO_3$ thin films were deposited on silicon (Example 4a), alumina (Example 4b), and single crystal $SrTiO_3$ (Example 4c) substrates by multiple spin-coating (at 3000 rpm) operations, with intermediate 300° C. heat treatments. Annealing of the sol-gel $KNbO_3$ films on silicon and alumina substrates at 700° C. resulted in complex XRD patterns (FIG. 6a) with unidentified non-perovskite phases. However, the x-ray diffraction pattern of a $KNbO_3$ film deposited on single crystal (210) $SrTiO_3$ and annealed at 700° C. (FIG. 6b) indicated epitaxial crystallization of perovskite $KNbO_3$ The (221) peak of perovskite $KNbO_3$ (d=1.802 Å) was the major peak in the XRD pattern; other $KNbO_3$ peaks were observed at d-spacings of 4.019 Å (110), 2.848 Å (200), and 2.010 Å (220). An unknown second phase with a d-spacing of 8.40 Å was present in the film, along with the (210) peak corresponding to the $SrTiO_3$ substrate. The peak at 8.40 Å also was present in the films deposited on silicon and alumina substrates.

EXAMPLES 5a and b

Figure 7:
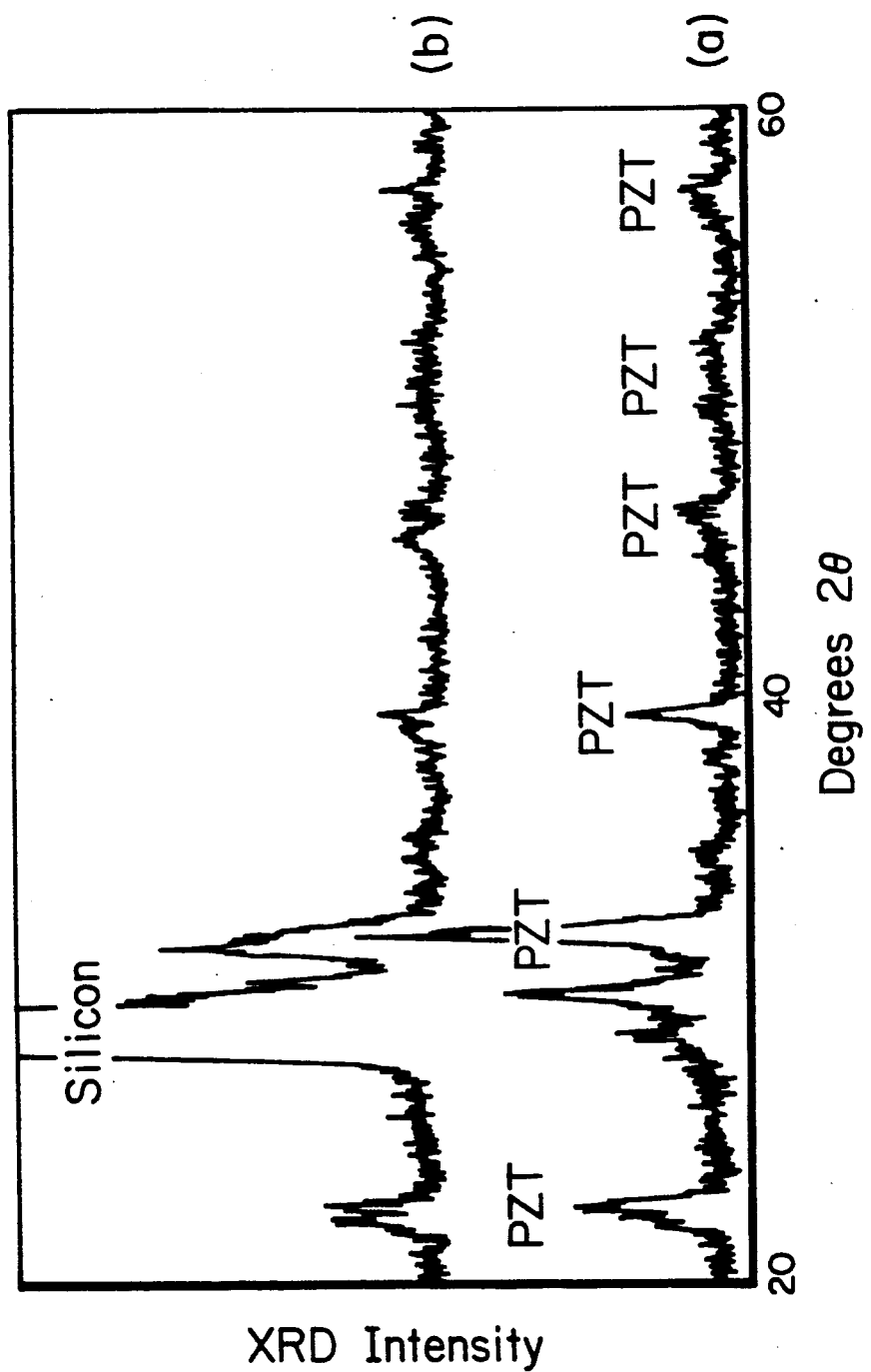
FIG. 7 shows x-ray diffraction patterns of composite $PbTiO_3$/PZT sol-gel thin films on silicon substrates, prepared with two coats of $PbTiO_3$ and four coats of PZT (40/60), according to (a) Example 5, and (b) Example 6.

In this example, the crystallization of a sol-gel derived PZT (40/60) $(Pb(Zr_{0.40}Ti_{0.60})O_3$ thin film on a silicon substrate was achieved through the use of a $PbTiO_3$ interlayer. A 0.15 M hydrolyzed Pb-Ti alkoxide solution was prepared as described in Example 1. A 0.18M hydrolyzed Pb-Ti-Zr alkoxide solution was prepared as described in Example 3; the Ti-isopropoxide and Zr-propoxide amounts were adjusted to the desired composition. Two coats of the $PbTiO_3$ sol-gel solution were deposited on silicon substrates (Example 5a) by spin coating at 1500 rpm (with intermediate 300° C. heat treatments after each spin-coating deposition). Four coats of the PZT sol-gel solution were then deposited by spin-coating (again with intermediate 300° C. heat treatments). Six coats of the sol-gel PZT solution were also applied to a non-$PbTiO_3$-coated silicon substrate for comparison (Example 5b). The films were then annealed at 600° C. for 15 minutes. X-ray diffraction (FIG. 7a) indicated that the composite $PZT/PbTiO_3$ films had crystallized into the desired perovskite structure. Conversely, x-ray diffraction indicated that the six-coat PZT film (without the $PbTiO_3$ interlayer) was amorphous after the 600° C. heat treatment. This experiment verified the beneficial effect of a $PbTiO_3$ interlayer in catalyzing the crystallization of PZT on an incompatible substrate. Since the $PbTiO_3$ interlayer was not annealed (crystallized) prior to the deposition of the sol-gel PZT film, the interlayer acted as a buffer between the PZT and the silicon substrate, thus promoting crystallization.

EXAMPLES 6a and b

An alternate embodiment of the invention to that revealed in Example 5 involves annealing of the two-layer PbTiO$_3$ films prior to deposition and annealing of the PZT films. The same two PbTiO$_3$ and PZT 40/60 sol-gel solutions of Example 5 were used. Two coats of sol-gel PbTiO$_3$ were applied to a silicon substrate by spin-coating, and the PbTiO$_3$ interlayer film was annealed at 600° C. for 15 minutes (Example 6a). X-ray diffraction confirmed that the two-layer PbTiO$_3$ film was crystalline with the perovskite structure. Four coats of the sol-gel PZT solution were then deposited on the crystalline PbTiO$_3$ interlayer, and the film was re-annealed at 600° C. for 15 minutes. The x-ray diffraction pattern of this film (FIG. 7b) also indicated that crystallization of tetragonal perovskite PZT was achieved during annealing. In this example, the crystallization of PZT is catalyzed by the PbTiO$_3$ interlayer for two reasons: 1) the interlayer acts as a buffer between the PZT and the silicon substrate; and 2) the crystalline perovskite PbTiO$_3$ also nucleates subsequent crystallization of perovskite PZT.

Figure 8:
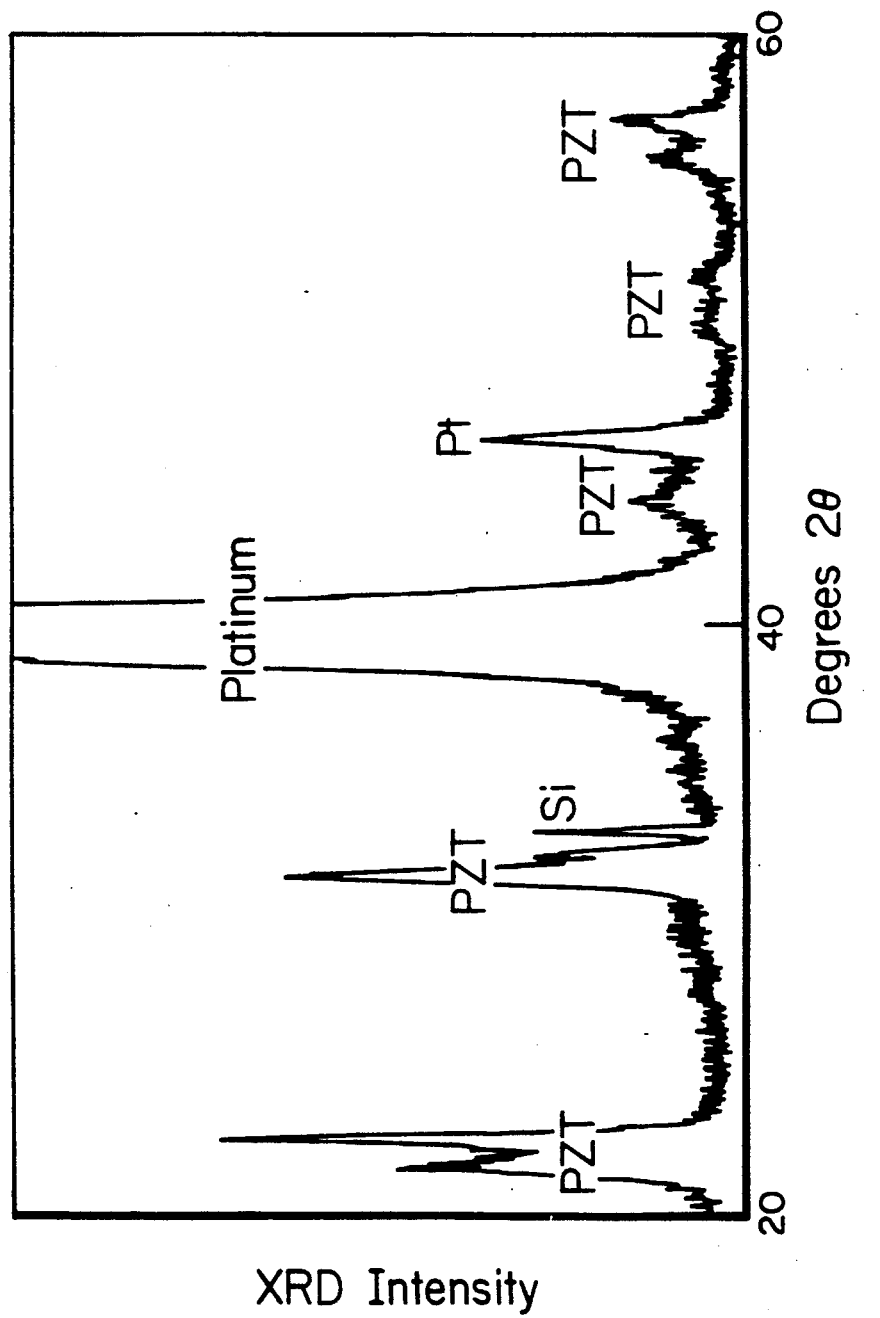
FIG. 8 shows an x-ray diffraction pattern of a composite $PbTiO_3$/PZT sol-gel thin film on a platinum-coated silicon substrate, prepared with two coats of $PbTiO_3$ and four coats of PZT (40/60), according to Example 6.

The same crystalline PbTiO$_3$ interlayer approach was applied to a Pt-coated silicon substrate, with equal success (Example 6b). FIG. 8 is an x-ray diffraction pattern of a composite PZT/PbTiO$_3$ on a Pt-coated silicon substrate. This film was prepared in the exact same manner as described above, and also exhibited the same desired tetragonal perovskite structure of PZT (40/60).

EXAMPLE 7

For the multicomponent PZT and PLZT sol-gel thin films to be described in Examples 8 through 14, stock alkoxide solutions were prepared. A lead methoxyethoxide stock solution was prepared by dissolving 37.9 grams of lead acetate hydrate in 300 ml of methoxyethanol at 80° C. The solution was distilled at 110° C. to remove the water and acetate. This lead methoxyethoxide stock solution was analyzed by ICP (inductively coupled plasma) to have a Pb concentration of 87.8 grams/liter (0.422 M).

A titanium methoxyethoxide stock solution was prepared by dissolving 30 ml of Ti-isopropoxide in 300 ml of methoxyethanol, and distillation at 110° C. to remove isopropanol. This titanium methoxyethoxide stock solution was analyzed by ICP to have a Ti concentration of 20.27 grams per liter (0.423 M).

A zirconium methoxyethoxide stock solution was prepared by dissolving 31.2 ml of Zr-propoxide in 300 ml of methoxyethanol, and distillation at 110° C. to remove isopropanol. This titanium methoxyethoxide stock solution was analyzed by ICP to have a Zr concentration of 55.3 grams per liter (0.606 M).

A pure lanthanum methoxyethoxide stock solution could not be prepared. Instead, a stock solution containing both lead and lanthanum was prepared by dissolving 8.0 grams of lead acetate hydrate in 300 ml of methoxyethanol. After this solution was distilled at 110° C. to remove water, 1.67 grams of La-isopropoxide was added and the solution was then distilled at 110° C. to remove the acetate and propanol. ICP analysis of this stock solution gave a Pb concentration of 12.85 grams per liter (0.062 M) and a La concentration of 2.5 grams per liter (0.017 M).

EXAMPLES 8a and b

In this example, the crystallization of a sol-gel derived PZT (53/47) (Pb(Zr$_{0.53}$Ti$_{0.47}$)O$_3$) thin film on a fused silica substrate was achieved through the use of a PbTiO$_3$ interlayer. A 0.15 M hydrolyzed Pb-Ti alkoxide solution was prepared as described in Example 1. The Pb-Zr-Ti alkoxide solution was prepared from the stock solutions described in Example 7. The PZT alkoxide solution was prepared by combining 35.4 ml of the Pb stock solution, 13.1 ml of the Zr stock solution, and 16.7 ml of the Ti stock solution; methoxyethanol was added to bring the total volume to 150 ml. The solution was distilled at 110° C. until the volume was reduced to 75 ml, and the solution was cooled to room temperature. A 25-ml portion was hydrolyzed by a methoxyethanol solution containing water and HNO$_3$ in amounts corresponding to 2:1 and 0.3:1 ratios of HNO$_3$ per mole of PZT. The final PZT concentration of the hydrolyzed alkoxide solution was 0.075 M.

Figure 9:
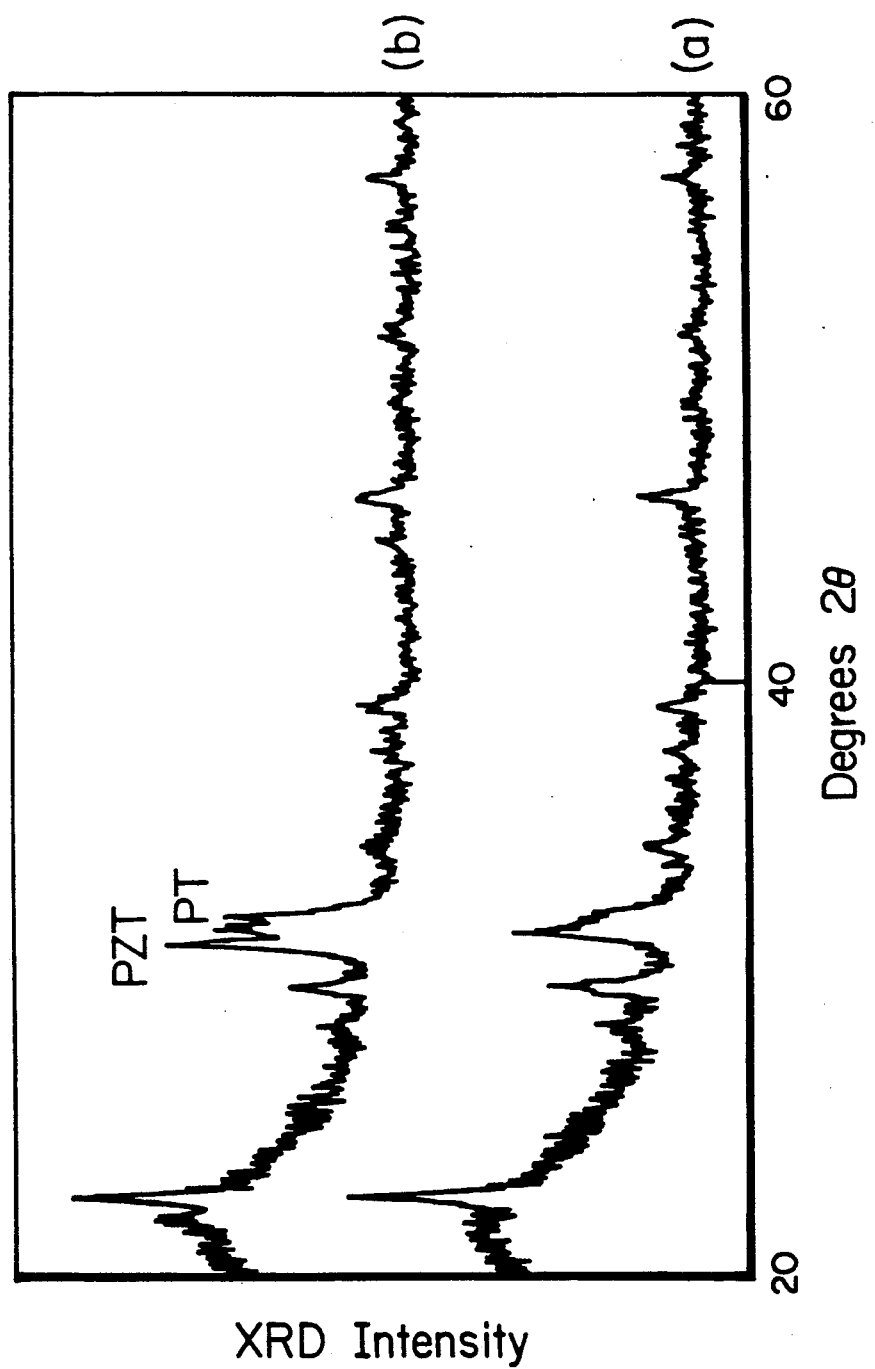
FIG. 9 shows x-ray diffraction patterns of $PbTiO_3$ and composite $PbTiO_3$/PZT films on fused silica substrates: (a) a four-layer sol-gel $PbTiO_3$ interlayer film annealed at 600° C.; and (b) a composite $PbTiO_3$/PZT sol-gel film with eight coats of PZT (53/47) deposited on the $PbTiO_3$ interlayer and annealed at 700° C., according to Example 8.

Four coats of the PbTiO$_3$ sol-gel solution were deposited on fused silica by spin coating at 2000 rpm (with intermediate heat treatments at 600° C. for five minutes after each spin-coating deposition, and a thirty minute heat treatment at 600° C. after the fourth PbTiO$_3$ deposition). Eight coats of the PZT sol-gel solution then were deposited by spin-coating (again with intermediate 600° C. heat treatments) (Example 8a). Eight coats of the sol-gel PZT solution also were applied to a non-PbTiO$_3$-coated fused silica substrate for comparison (Example 8b). The final annealing treatment for both the composite PbTiO$_3$/PZT and the PZT films was 700° C. for 30 minutes. An x-ray diffraction pattern of the four-layer PbTiO$_3$ interlayer film deposited on fused silica (after the 30-minute heat treatment at 600° C.) is presented in FIG. 9a. The expected tetragonal structure of perovskite PbTiO$_3$ was observed in this interlayer film. The x-ray diffraction pattern (FIG. 9b) of the composite PZT/PbTiO$_3$ film (after the 700° C. heat treatment) confirmed that perovskite PZT crystallized on the PbTiO$_3$ interlayer film. X-ray diffraction confirmed that the eight-layer PZT film (without the PbTiO$_3$ interlayer) was amorphous after annealing at 700° C. This example further proves the utility of the PbTiO$_3$ interlayer in catalyzing the crystallization of perovskite PZT sol-gel films on fused silica substrates.

EXAMPLES 9a and b

Figure 10:
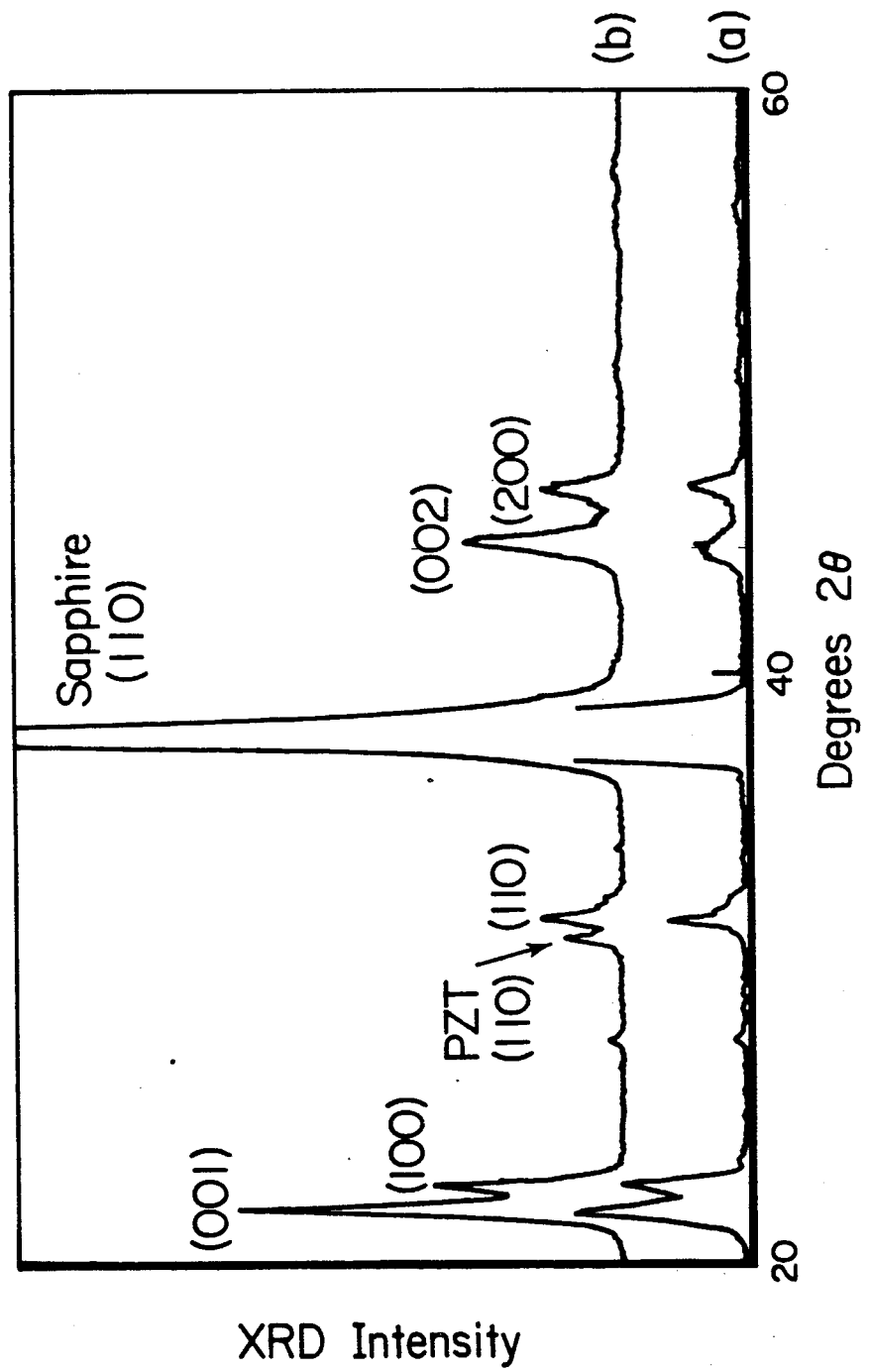
FIG. 10 shows x-ray diffraction patterns of $PbTiO_3$ and composite $PbTiO_3$/PZT films on sapphire substrates: (a) a four-layer sol-gel $PbTiO_3$ interlayer film annealed at 600° C.; and (b) a composite PbTiO3/PZT sol-gel film with eight coats of PZT (53/47) deposited on the $PbTiO_3$ interlayer and annealed at 700° C., according to Example 9.
Figure 11:
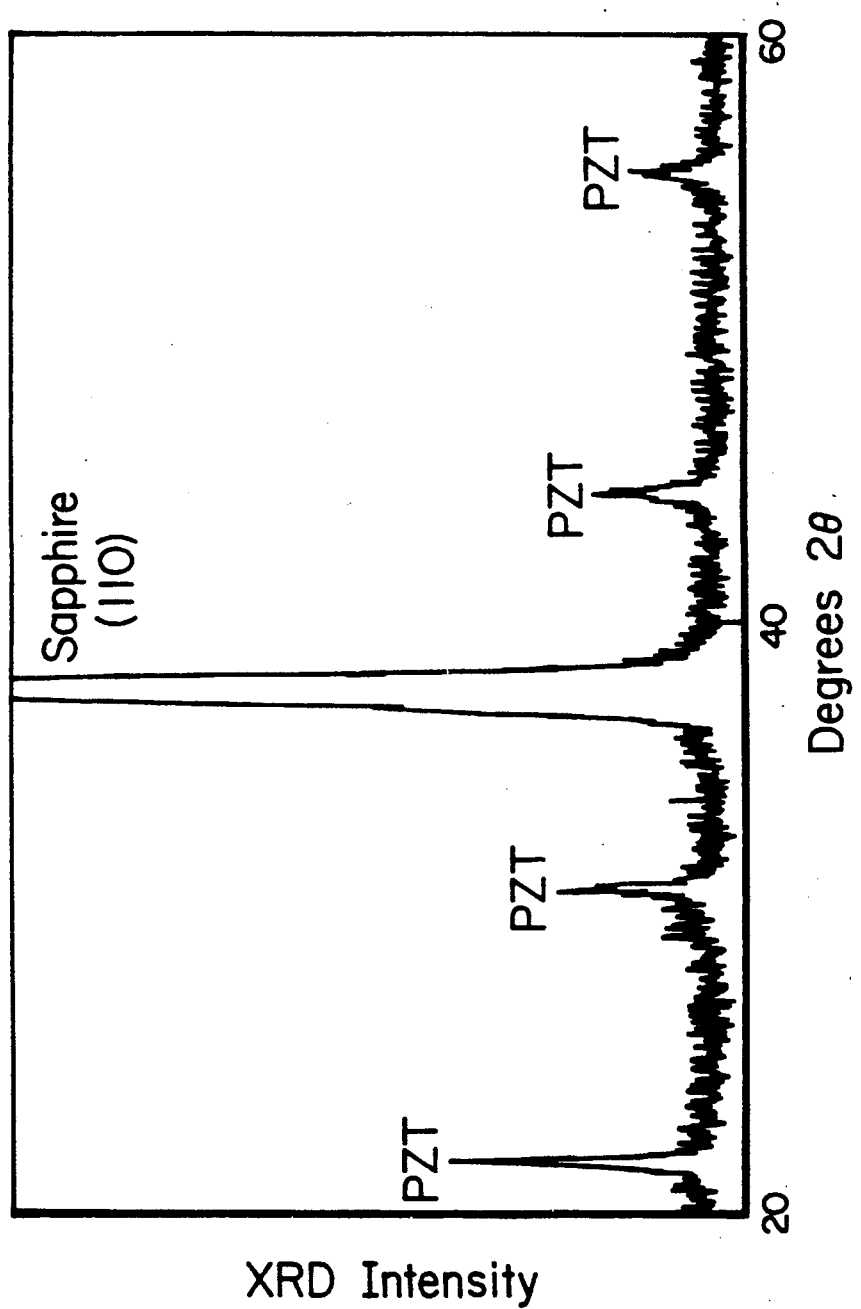
FIG. 11 shows an x-ray diffraction pattern of an eight-layer sol-gel PZT film deposited on a sapphire substrate (without a PbTiO$_3$ interlayer), and annealed at 700° C., according to Example 9.

In this example, a sol-gel PZT (53/47) thin film on a sapphire substrate was prepared with a PbTiO$_3$ interlayer. The same Pb-Ti and Pb-Ti-Zr hydrolyzed alkoxide solutions from Example 8 were used. Four coats of the PbTiO$_3$ sol-gel solution were deposited on sapphire by spin coating at 2000 rpm (with intermediate heat treatments at 600° C. for five minutes after the first three spin-coating depositions and for thirty minutes after the fourth PbTiO$_3$ deposition). Eight coats of the PZT sol-gel solution then were deposited by spin-coating (again with intermediate 600° C. heat treatments). The composite PbTiO$_3$/PZT film was given a final heat treatment at 700° C. for thirty minutes (Example 9a). For comparison, eight coats of the same sol-gel PZT solution were applied to a virgin (non-PbTiO$_3$-coated) sapphire substrate, and the PZT film then was annealed at 700° C. for 30 minutes (Example 9b). An x-ray diffraction pattern of the four-layer PbTiO$_3$ interlayer film (after the 30-minute heat treatment at 600° C.) is presented in FIG. 10a. The large intensities of the XRD peaks indicated that the PbTiO$_3$ interlayer film deposited on sapphire was highly crystalline. A preferred orientation of the PbTiO$_3$ interlayer film also was apparent from the extremely high relative intensity of the (001) and (100) XRD peaks, compared to the (110) and (101) XRD peaks (which normally correspond to the major XRD peaks of PbTiO$_3$). This suggests that the (100) and (001) directions of the PbTiO$_3$ crystallites in the film were aligned in the plane of the film. The x-ray diffraction pattern (FIG. 10b) of the composite PbTiO$_3$/PZT film (after the 700° C. heat treatment) indicated an increased crystallinity (i.e., higher XRD peak intensities) compared to the PbTiO$_3$ interlayer film, and that the preferred orientation of the PbTiO$_3$ interlayer film was maintained in the composite PbTiO$_3$/PZT film. X-ray diffraction (FIG. 11) indicated that the eight-layer PZT film (without the PbTiO$_3$ interlayer) also crystallized into the desired perovskite structure with a similar preferred orientation, but with a significantly lower crystallinity than the composite PbTiO$_3$/PZT film. This example further verifies the beneficial effect of a PbTiO$_3$ interlayer film in increasing crystallinity of sol-gel PZT thin films. It also demonstrates that the perovskite interlayer approach has utility in producing highly crystalline, oriented ferroelectric thin films.

EXAMPLES 10a and b

In this example, the crystallization of a sol-gel derived PLZT (9/65/35) (($Pb_{0.91}La_{0.09}$)($Zr_{0.064}Ti_{0.34}$)$O_3$) thin film on a fused silica substrate was achieved through the use of a PbTiO$_3$ interlayer. A 0.15 M hydrolyzed Pb-Ti alkoxide solution was prepared as described in Example 1. The Pb-La-Zr-Ti alkoxide solution was prepared from the stock solutions of Example 7, by combining 7.08 ml of the Pb stock solution, 25 ml of the Pb-La stock solution, 5.24 ml of the Zr stock solution, and 4.04 ml of the Ti stock solution; methoxyethanol was added to bring the volume to 50 ml (corresponding to a PLZT concentration of 0.10 M). The mixed solution was refluxed for three hours under argon. A 25-ml portion of the mixed alkoxide solution was hydrolyzed with a methoxyethanol solution containing water and HNO$_3$ in amounts corresponding to 2:1 and 0.3:1 ratios of water and HNO$_3$ per mole of PLZT. The final PLZT concentration was 0.075M.

Figure 12:
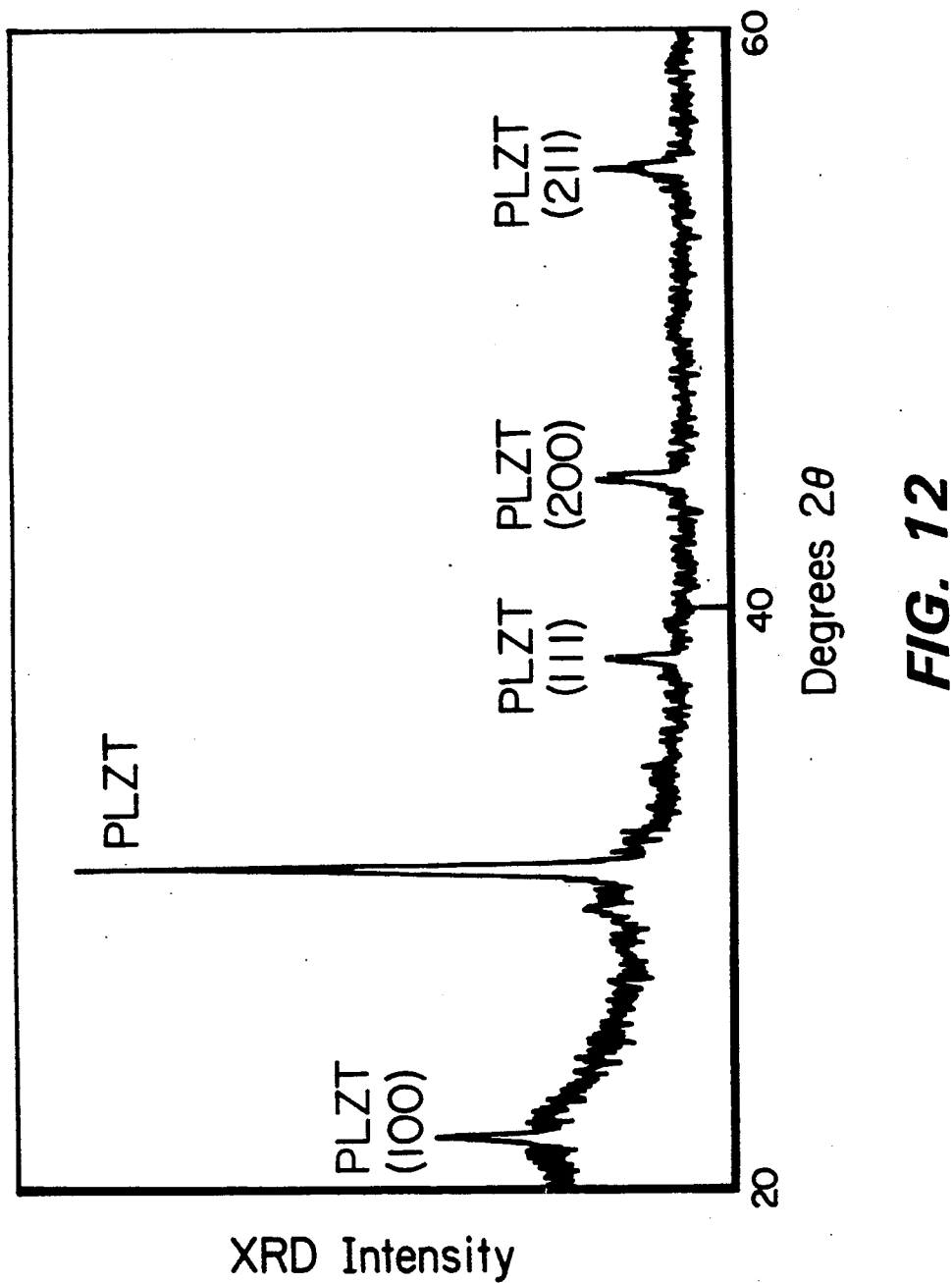
FIG. 12 shows an x-ray diffraction pattern of a composite PbTiO$_3$/PLZT sol-gel thin film on a fused silica substrate, with three coats of PbTiO$_3$ deposited and annealed at 600° C. and eight coats of PLZT (9/65/35) deposited on the PbTiO$_3$ interlayer and annealed at 600° C., according to Example 10.

Three coats of the PbTiO$_3$ sol-gel solution were deposited on a fused silica substrate by spin coating, with intermediate 300° C. heat treatments after the first two spin-coating depositions, and a heat treatment at 600° C. for 30 minutes following the third PbTiO$_3$ coat. Eight coats of the PLZT sol-gel solution then were deposited by spin-coating (again with intermediate 300° C. heat treatments) on the PbTiO$_3$-coated silica substrate, with a final heat treatment at 600° C. for 30 minutes (Example 10a). For comparison, eight coats of the sol-gel PLZT solution were applied to a non-PbTiO$_3$-coated fused silica substrate and annealed at 600° C. for 30 minutes (Example 10b). X-ray diffraction (FIG. 12) indicated that the composite PbTiO$_3$/PLZT film had crystallized into the desired perovskite structure. Conversely, x-ray diffraction indicated that the six-layer PLZT film deposited on the fused silica substrate (without the PbTiO$_3$ interlayer) was amorphous after the 600° C. heat treatment.

EXAMPLES 11a and b

Figure 13:
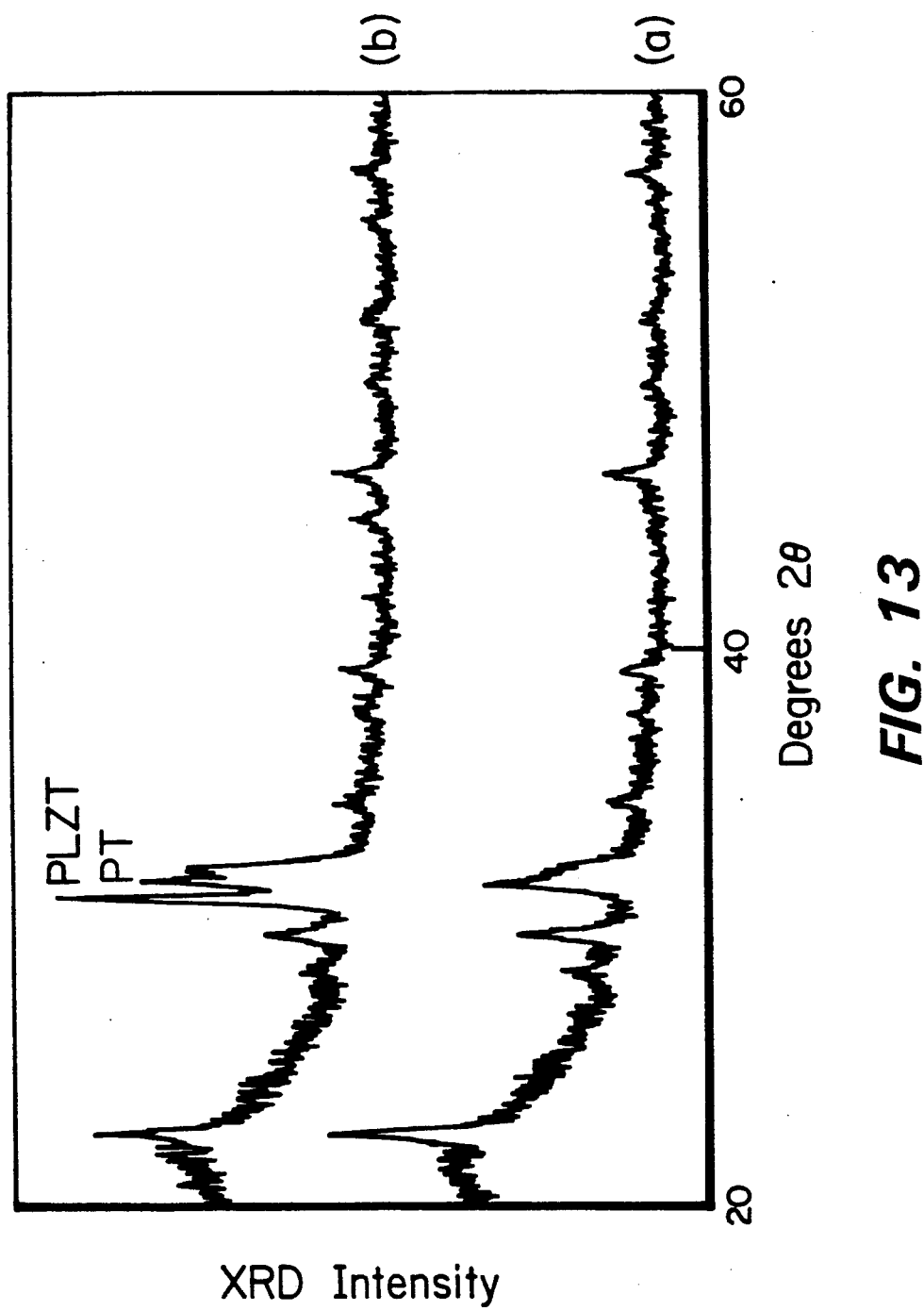
FIG. 13 shows x-ray diffraction patterns of PbTiO$_3$ and composite PbTiO$_3$/PLZT films on fused silica substrates: (a) a four-layer sol-gel PbTiO$_3$ interlayer film annealed at 600° C.; and (b), a composite PbTiO$_3$/PLZT sol-gel film with eight coats of PLZT (9/65/35) deposited on the PbTiO$_3$ interlayer and annealed at 700° C., according to Example 11.

In this example, the crystallization of a sol-gel derived PLZT (9/65/35) thin film on a fused silica substrate was achieved through the use of a PbTiO$_3$ interlayer, with alternative heat treatment conditions. A 0.15M hydrolyzed Pb-Ti alkoxide solution and a 0.075 M hydrolyzed Pb-La-Ti-Zr alkoxide solution were prepared as described in Examples 1 and 10. The film was prepared in a manner identical to that of Examples 8 and 9. Four coats of the PbTiO$_3$ sol-gel solution were deposited on a fused silica substrate by spin coating, with intermediate 600° C. heat treatments after the first three spin-coating depositions, and a heat treatment at 600° C. for 30 minutes following the fourth PbTiO$_3$ coat. Eight coats of the PLZT sol-gel solution then were deposited by spin-coating (again with intermediate 600° C. heat treatments) on the PbTiO$_3$-coated silica substrate, with a final heat treatment at 700° C. for 30 minutes after the eighth PLZT coat (Example 11a). X-ray diffraction (FIG. 13) indicated that the composite PLZT/PbTiO$_3$ film was crystalline with the desired perovskite structure. Conversely, x-ray diffraction indicated that a six-layer PLZT film (without the PbTiO$_3$ interlayer) was amorphous after the 600° C. heat treatment (Example 11b).

EXAMPLES 12a and b

Figure 14:
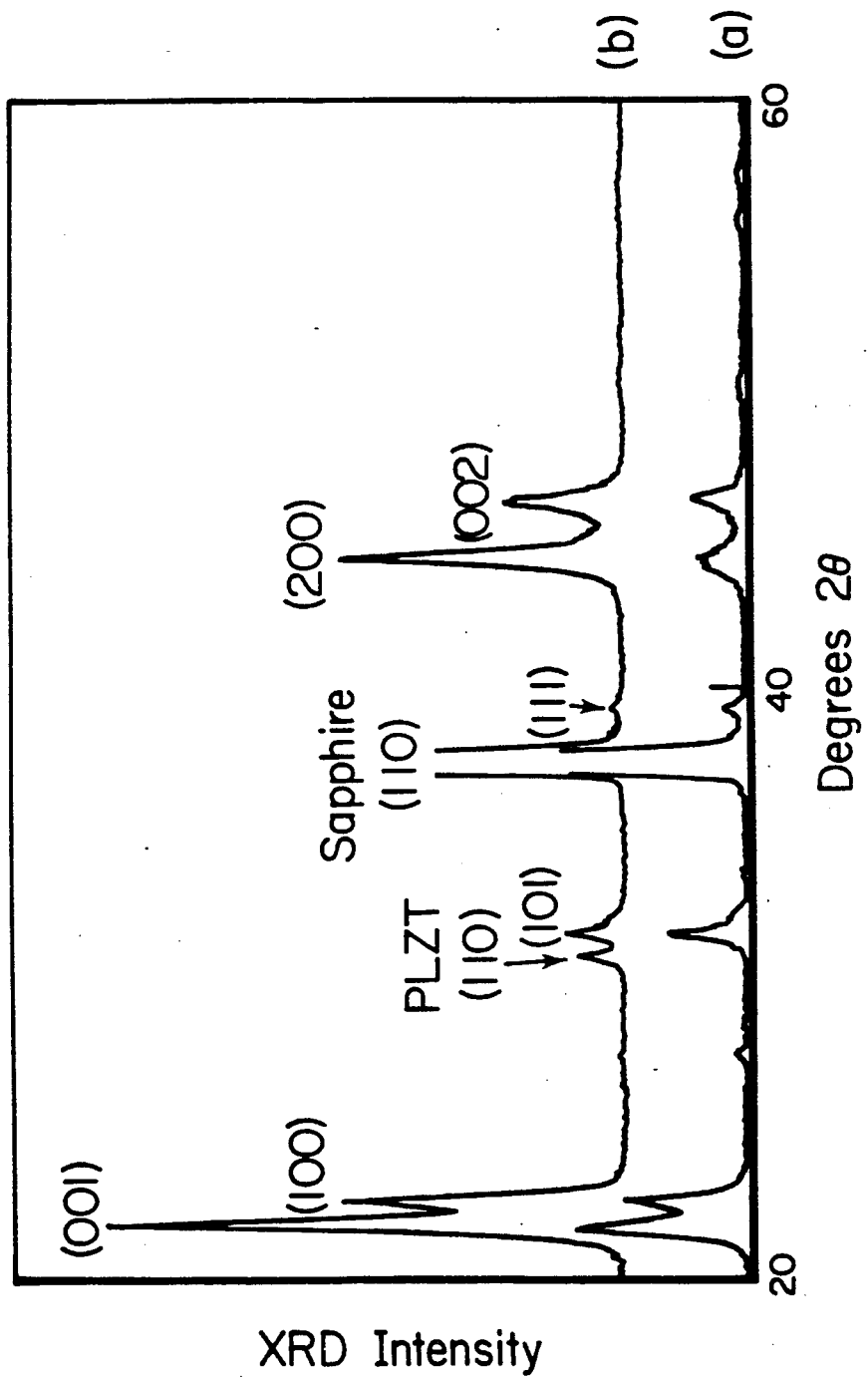
FIG. 14 shows x-ray diffraction patterns of PbTiO$_3$ and composite PbTiO$_3$/PLZT films on sapphire substrates: (a) a four-layer sol-gel PbTiO$_3$ interlayer film annealed at 600° C.; and (b) a composite PbTiO$_3$/PLZT sol-gel film with eight coats of PLZT (9/65/35) deposited on the PbTiO$_3$ interlayer and annealed at 700° C., according to Example 12.
Figure 15:
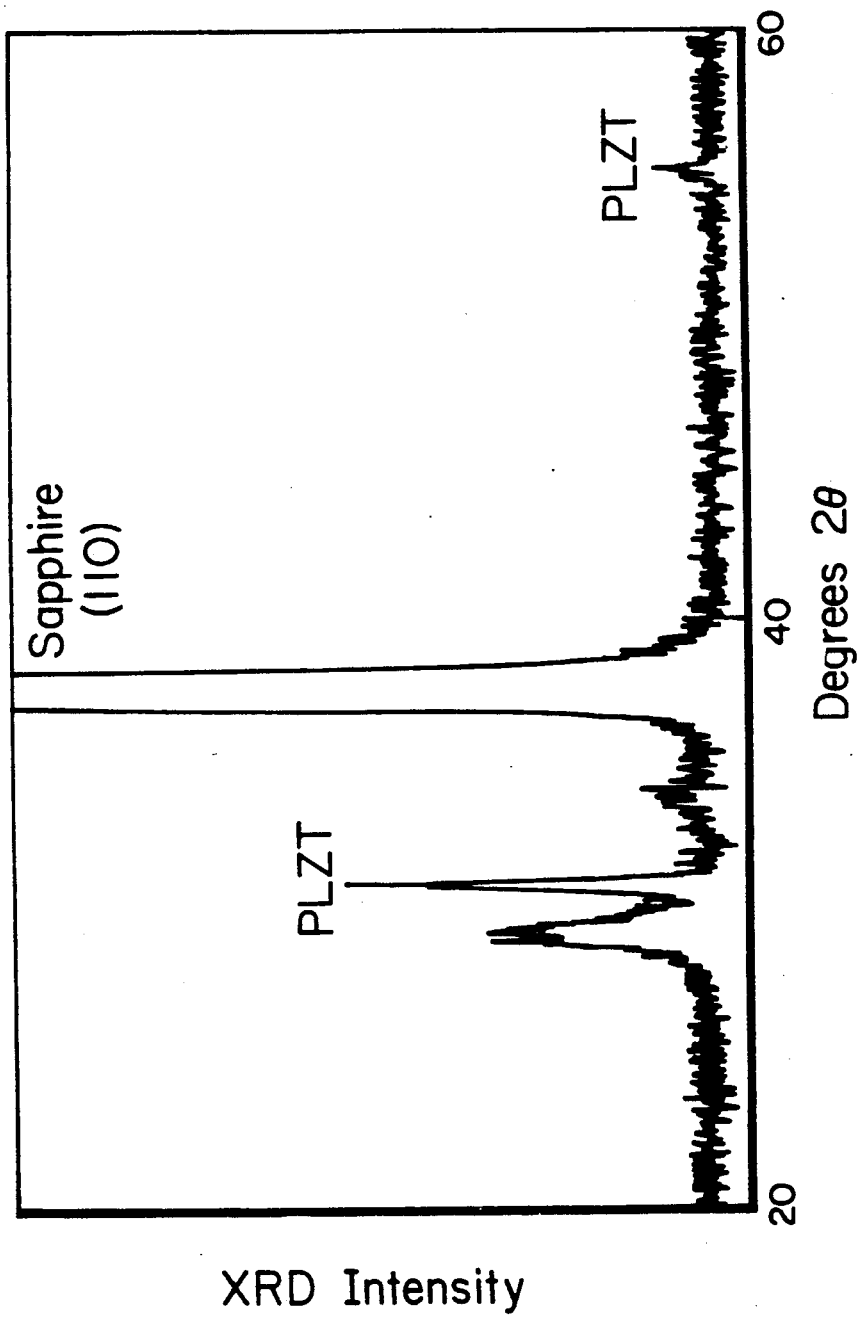
FIG. 15 shows an x-ray diffraction pattern of an eight-layer sol-gel PLZT film deposited on a sapphire substrate (without a PbTiO$_3$ interlayer), and annealed at 700° C., according to Example 12.

In this example, the crystallization of sol-gel derived PLZT (9/65/35) thin films on a sapphire substrate was achieved through the use of a PbTiO$_3$ interlayer. A 0.15 M hydrolyzed Pb-Ti alkoxide solution and a 0.075 M hydrolyzed Pb-La-Zr-Ti alkoxide solution were prepared as described in Examples 1 and 10. A composite PbTiO$_3$/PLZT film was prepared in a manner identical to that of Examples 8, 9, and 11. Four coats of the PbTiO$_3$ sol-gel solution were deposited on sapphire by spin coating at 2000 rpm (with intermediate heat treatments at 600° C. for five minutes after the first three spin-coating depositions and for thirty minutes after the fourth PbTiO$_3$ deposition). Eight coats of the PLZT sol-gel solution then were deposited by spin-coating at 2000 rpm (again with intermediate 600° C. heat treatments) (Example 12a). For comparison, eight coats of the PLZT sol-gel solution were spin-coated onto a virgin sapphire substrate (with 600° C. intermediate heat treatments) (Example 12b). The final annealing treatment for both the composite PbTiO$_3$/PLZT and the PLZT films was 700° C. for 30 minutes. X-ray diffraction patterns of the four-layer PbTiO$_3$ interlayer film (after the 30-minute heat treatment at 600° C.) and the composite PbTiO$_3$/PLZT film (after the final 700° C. heat treatment) are compared in FIG. 14. As was shown in Example 9, the composite PbTiO$_3$/PLZT film also was highly crystalline, and a strong preferred orientation of the (100) and (001) directions in the plane of the film. X-ray diffraction (FIG. 15) indicated that the eight-layer PLZT film (without the PbTiO$_3$ interlayer) was weakly crystalline, with only a small proportion of perovskite PLZT. This example provides further demonstration of the beneficial effect of a PbTiO$_3$ interlayer film for the fabrication of crystalline PLZT sol-gel films, and that the fabrication of oriented ferroelectric thin films is possible with this approach.

EXAMPLE 13

Figure 16:
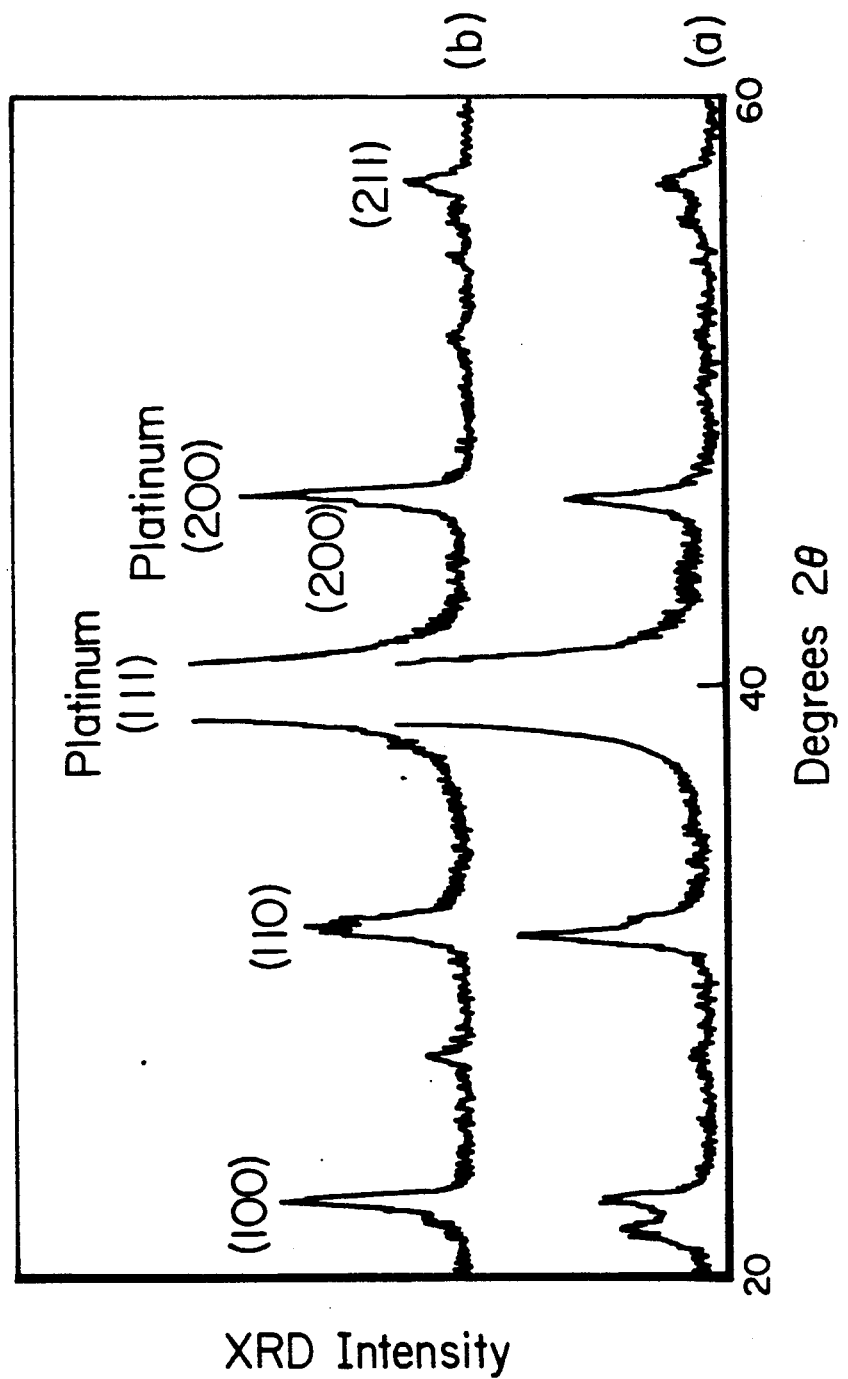
FIG. 16 shows x-ray diffraction patterns of PbTiO$_3$ and composite PbTiO$_3$/PLZT films on platinum-coated silicon substrates: (a) a four-layer sol-gel PbTiO$_3$ interlayer film annealed at 600° C.; and (b) a composite PbTiO$_3$/PLZT sol-gel film with eight coats of PLZT (9/65/35) deposited on the PbTiO$_3$ interlayer and annealed at 700° C., according to Example 13.

In this example, a sol-gel PLZT (9/65/35) thin film was deposited on a platinum-coated silicon substrate with a PbTiO3 interlayer. A 0.15 M hydrolyzed Pb-Ti alkoxide solution and a 0.075M hydrolyzed Pb-La-Zr-Ti alkoxide solution were prepared as described in Examples 1 and 10. A composite PbTiO3/PLZT film was prepared in a manner identical to that of Examples 8, 9, 11, and 12. Four coats of the PbTiO3 sol-gel solution were deposited on sapphire by spin coating at 2000 rpm (with intermediate heat treatments at 600° C. for five minutes after the first three spin-coating depositions and for thirty minutes after the fourth PbTiO3 deposition). Eight coats of the PLZT sol-gel solution then were deposited by spin-coating (again with intermediate 600° C. heat treatments). The final annealing treatment for both the composite PbTiO3/PLZT film was 700° C. for 30 minutes. X-ray diffraction patterns of the four-layer PbTiO3 interlayer film (after the 30-minute heat treatment at 600° C.) and the composite PbTiO3/PLZT film (after the final 700° C. heat treatment) are compared in FIG. 16. The composite PbTiO3/PLZT film also was highly crystalline, with the desired perovskite structure.

EXAMPLE 14

Figure 17:
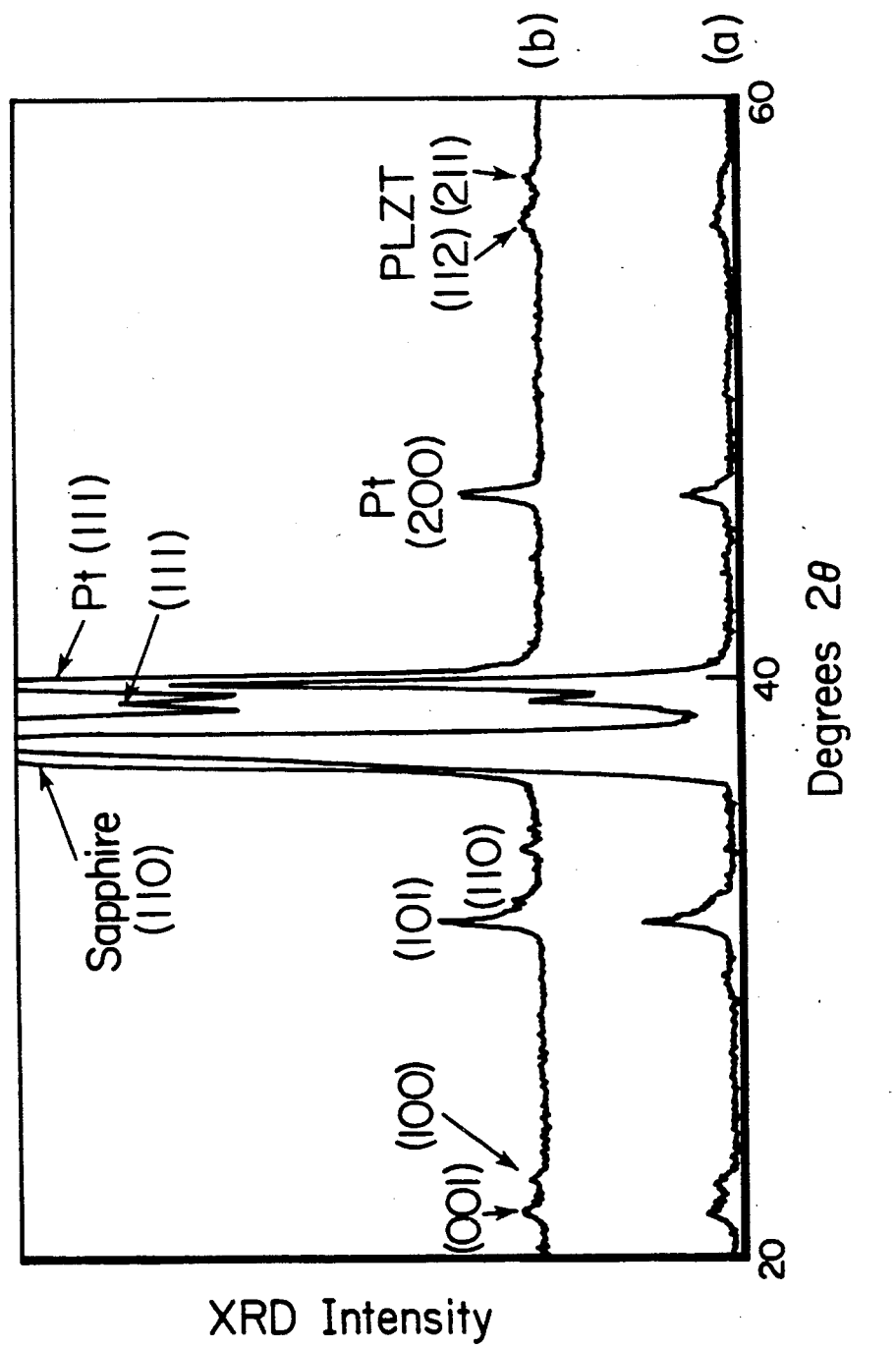
FIG. 17 shows x-ray diffraction patterns of PbTiO$_3$ and composite PbTiO$_3$/PLZT films on platinum-coated sapphire substrates: (a) a four-layer sol-gel PbTiO$_3$ interlayer film annealed at 600° C.; and (b) a composite PbTiO$_3$/PLZT sol-gel film with eight coats of PLZT (9/65/35) deposited on the PbTiO$_3$ interlayer and annealed at 700° C., according to Example 14.

In this example, the crystallization of a sol-gel derived PLZT (9/65/35) thin film on a platinum-coated sapphire substrate was achieved through the use of a PbTiO3 interlayer. A 0.15 M hydrolyzed Pb-Ti alkoxide solution and a 0.075 M hydrolyzed Pb-La-Zr-Ti alkoxide solution were prepared as described in Examples 1 and 10. A composite PbTiO3/PLZT film was prepared in a manner identical to that of Examples 8, 9, 11, 12, and 13. Four coats of the PbTiO3 sol-gel solution were deposited on platinum-coated sapphire by spin coating at 2000 rpm (with intermediate heat treatments at 600° C. for five minutes after the first three spin-coating depositions and for thirty minutes after the fourth PbTiO3 deposition). Eight coats of the PLZT sol-gel solution then were deposited by spin-coating (again with intermediate 600° C. heat treatments). The final annealing treatment for the composite PbTiO3/PLZT film was 700° C. for 30 minutes. X-ray diffraction patterns of the four-layer PbTiO3 interlayer film (after the 30-minute heat treatment at 600° C.) and the composite PbTiO3/PLZT film (after the final 700° C. heat treatment) are compared in FIG. 17. The composite PbTiO3/PLZT film on platinum-coated sapphire was highly crystalline. However, in contrast to the composite PbTiO3/PLZT thin film on platinum-coated silicon (Example 12), the composite PbTiO3/PLZT film of this example crystallized with a strong preferred orientation. The sputtered platinum film had a preferred (111) orientation. The PLZT film crystallized quasi-epitaxially on the platinum, with the same (111) orientation. This example further demonstrates that a highly crystalline and oriented PLZT thin film can be prepared using a PbTiO3 interlayer. It is especially significant that, in contrast to Examples 9 and 12, the oriented PLZT thin film was prepared on a polycrystalline (sputtered platinum) material, instead of a single crystal (sapphire) material. This is extremely important with respect to future device applications, which will require that the ferroelectric thin films are deposited on substrates coated with an electrode material, such as platinum. For instance, it may be possible to prepare oriented PLZT thin films on a wider variety of substrates, by modifying the deposition conditions for the platinum (or whatever electrode material is used).

EXAMPLE 15

Figure 18:
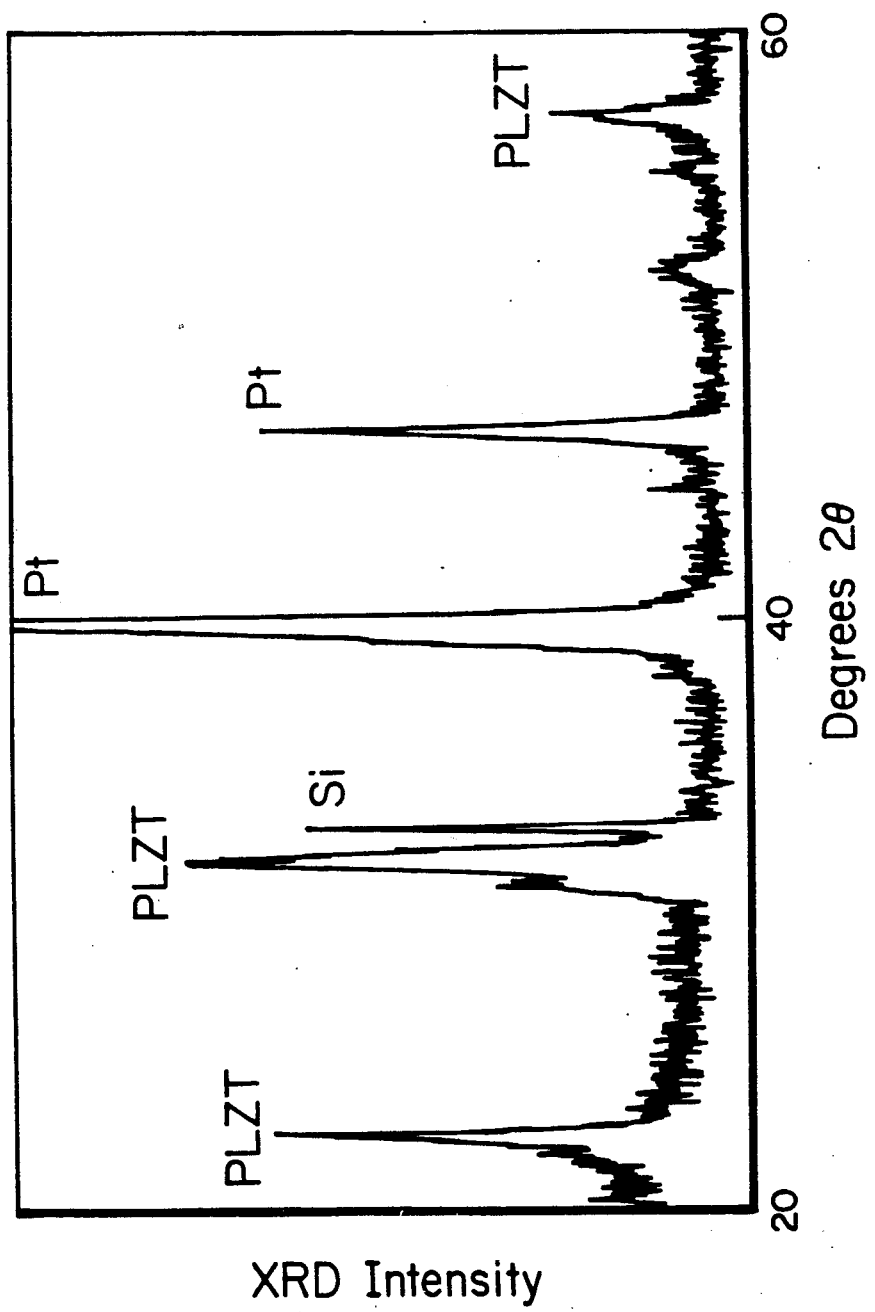
FIG. 18 shows an x-ray diffraction pattern of a composite SrTiO$_3$/PLZT sol-gel thin film on a fused silica substrate: with four coats of SrTiO$_3$ deposited and annealed at 600° C., and eight coats of PLZT (9/65/35) deposited on the SrTiO$_3$ interlayer and annealed at 600° C., according to Example 15.

In this example, the crystallization of a sol-gel derived PLZT (9/65/35) thin film on a platinum-coated silicon substrate was achieved through the use of a SrTiO3 interlayer. A 0.15 M hydrolyzed Sr-Ti alkoxide solution was prepared as in Example 2, and a 0.075 M hydrolyzed Pb-La-Ti-Zr alkoxide solution was prepared as described in Example 10. Four coats of the SrTiO3 sol-gel solution were deposited on a platinum-coated silicon substrate by spin coating, with intermediate 400° C. heat treatments after the first three spin-coating depositions, and a heat treatment at 600° C. for 30 minutes following the fourth SrTiO3 coat Eight coats of the PLZT sol-gel solution then were deposited by spin-coating (again with intermediate 400° C. heat treatments) on the PbTiO3-coated fused silica substrate, with a final heat treatment at 700° C. for 30 minutes following the eighth PLZT coat. X-ray diffraction (FIG. 18) indicated that the composite SrTiO3/PLZT film had crystallized into the desired perovskite structure. This example demonstrates that a SrTiO3 interlayer also can be used for the deposition of crystalline, perovskite PLZT thin films.

EXAMPLE 16

Figure 19:
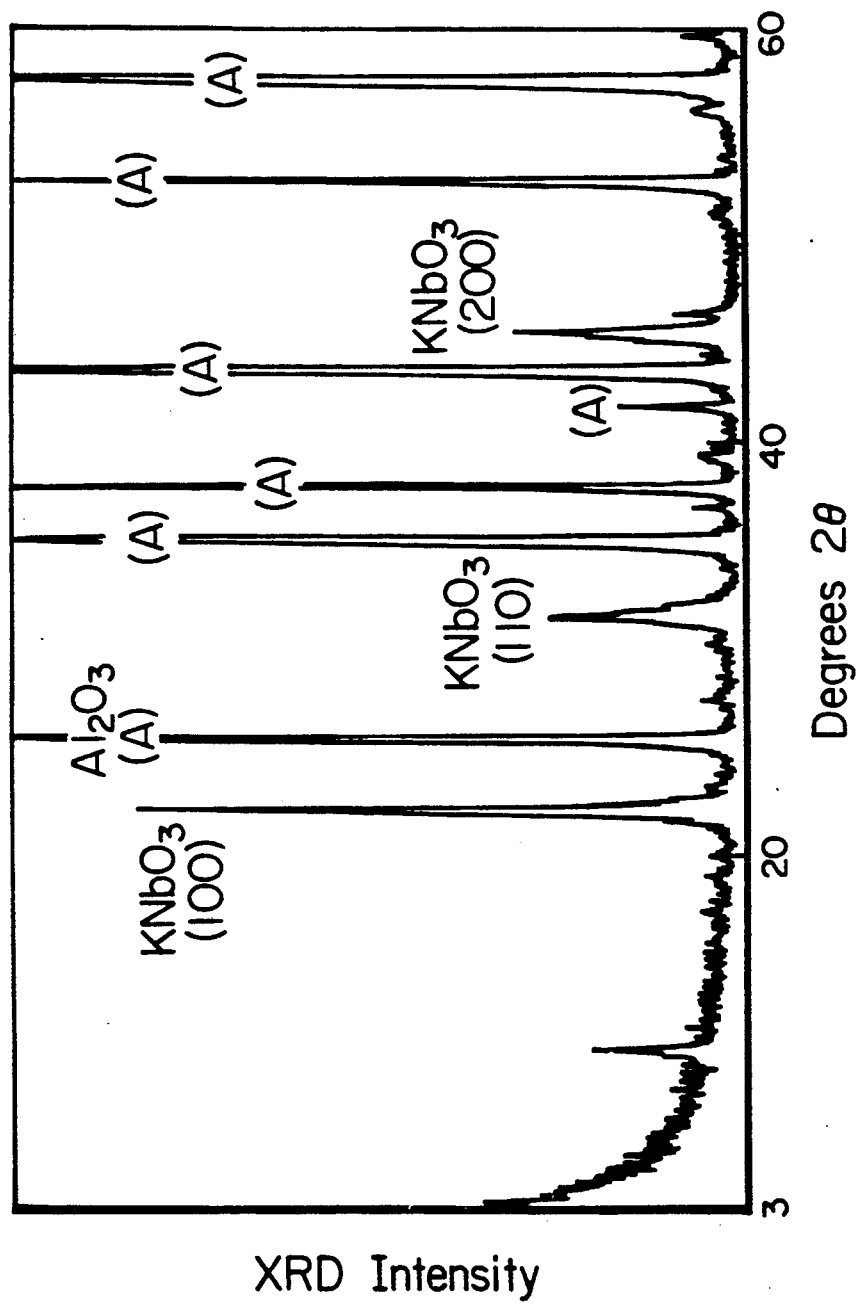
FIG. 19 shows an x-ray diffraction pattern of a composite PbTiO$_3$/KNbO$_3$ sol-gel thin film on an alumina substrate, with two coats of PbTiO$_3$ deposited and annealed at 600° C., and six coats of KNbO$_3$ deposited on the PbTiO$_3$ interlayer and annealed at 600° C., according to Example 16.

In this example, the crystallization of a sol-gel derived KNbO3 thin film on an alumina substrate was achieved through the use of a PbTiO3 interlayer. A 0.15 M hydrolyzed Pb-Ti alkoxide solution was prepared as described in Example 1, and a 0.30 M hydrolyzed K-Nb alkoxide solution were prepared as described in Example 4. Two coats of the PbTiO3 sol-gel solution were deposited on alumina substrates by spin coating at 1500 rpm (with intermediate 300° C. heat treatments after each spin-coating deposition), and the PbTiO3 interlayer film was annealed at 600° C. for 30 minutes. Six coats of the KNbO3 sol-gel solution then were deposited by spin-coating at 3000 rpm (again with intermediate 300° C. heat treatments) on the PbTiO3-coated silicon substrates, followed by re-annealing at 600° C. for 30 minutes. X-ray diffraction (FIG. 19) indicated that the composite KNbO3/PbTiO3 film had crystallized into the desired perovskite structure, although some secondary crystalline phases also were present. This perovskite KNbO3 phase was cubic, whereas the expected perovskite KNbO3 has an orthorhombic distortion. It is likely that the perovskite KNbO3 phase was cubic because of the fine crystallite size of the KNbO3 in the film. This example demonstrates that crystalline and perovskite KNbO3 sol-gel thin films can be prepared with a PbTiO3 interlayer.

EXAMPLE 17

Figure 20:
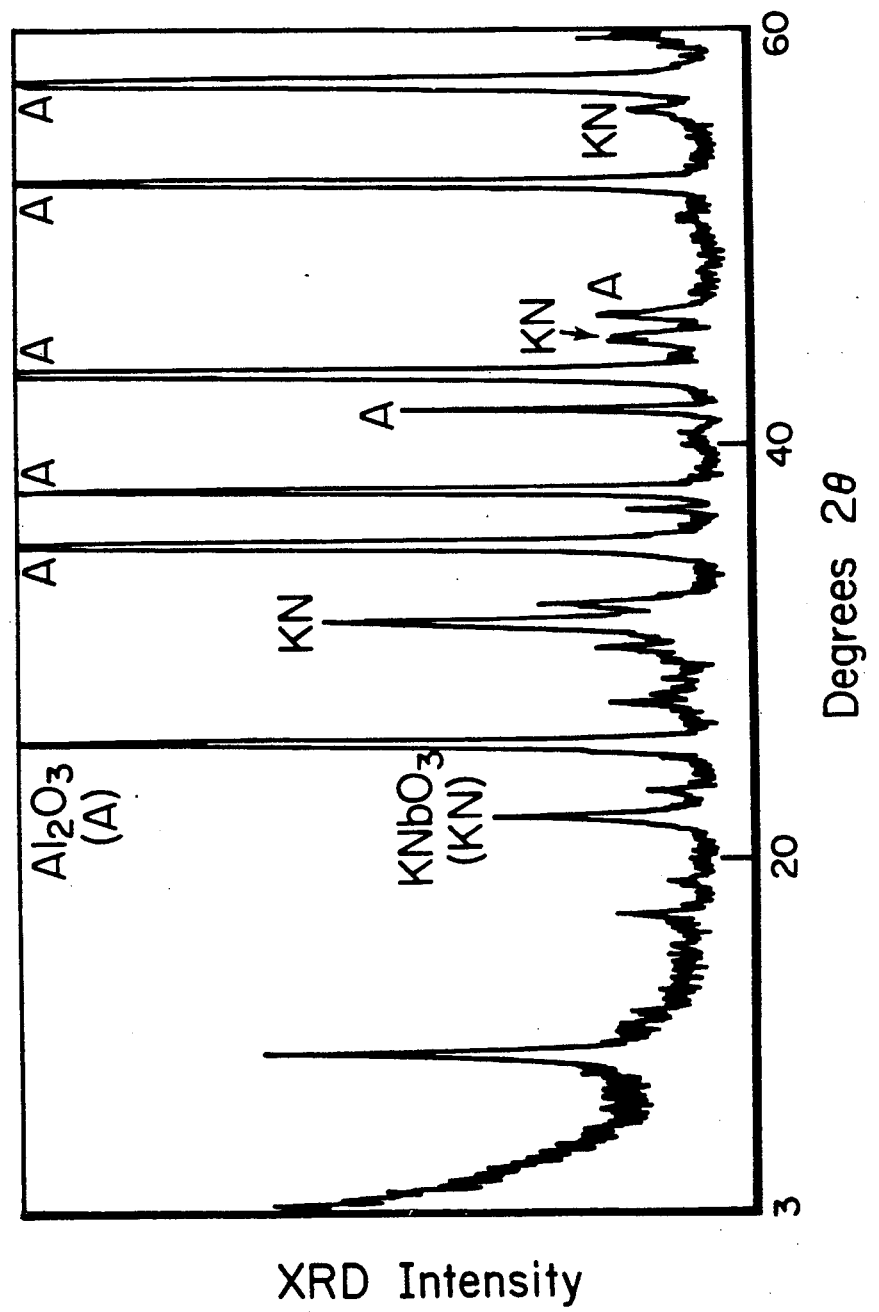
FIG. 20 shows an x-ray diffraction pattern of a composite SrTiO$_3$/KNbO$_3$ sol-gel thin film on an alumina substrate, with four coats of PbTiO$_3$ deposited and annealed at 600° C. and six coats of KNbO$_3$ deposited on the SrTiO$_3$ interlayer and annealed at 600° C., according to Example 17.

In this example, the crystallization of a sol-gel KNbO3 thin film on an alumina substrate was achieved through the use of a SrTiO3 interlayer. A 0.16 M hydrolyzed Sr-Ti alkoxide solution was prepared as described in Example 2, and a 0.30 M hydrolyzed K-Nb alkoxide solution were prepared as described in Example 4. Six coats of the SrTiO3 sol-gel solution were deposited on alumina substrates by spin coating at 1500 rpm (with intermediate 400° C. heat treatments after the first three spin-coating depositions and a heat treatment at 600° C. for thirty minutes following the fourth SrTiO3 coat). Eight coats of the KNbO3 sol-gel solution then were deposited by spin-coating (with intermediate 400° C. heat treatments) on the SrTiO3-coated alumina substrates, with a final heat treatment of 600° C. for 30 minutes. X-ray diffraction (FIG. 20) indicated that the composite SrTiO$_3$/KNbO$_3$ film had crystallized into the desired perovskite structure, although some secondary crystalline phases were also present. This example provides a demonstration of the enhanced crystallization of perovskite KNbO$_3$ thin films through the use of a SrTiO$_3$ interlayer.

If desired one or more additional layers of a perovskite thin film different from the second layer material may be deposited on the second layer discussed in the examples above. The additional layer or layers can be heat treated as they are deposited or heat treated as a final step after all are deposited to form perovskites.

Various devices may advantageously be constructed from the composite ferroelectric thin films obtained from the invention. Examples of these devices include nonvolatile semiconductor memory devices, surface acoustic wave devices, pyroelectric wave devices, thin film capacitor devices, optical waveguide devices, frequency doubling (second harmonic generation) devices, nonlinear optical devices, spatiallight modulator devices, optical memory devices, and sensor devices. Specific examples of the above listed devices all include a first deposited layer selected from the group consisting of lead titanate (PbTiO$_3$), strontium titanate (SrTiO$_3$) or another perovskite whose crystallization is independent of the substrate; and a second deposited layer selected from the group consisting of: (a) lead zirconate titanate (PZT), lead zirconate (PbZrO$_3$), lead lanthanum titanate ((Pb,La)TiO$_3$), and lead lanthanum zirconate ((Pb,La)ZrO$_3$), when the device is a nonvolatile semiconductor memory device; (b) lead zirconate titanate (PZT), lead zirconate (PbZrO$_3$), and lead lanthanum titanate ((Pb,La)TiO$_3$), when the device is a surface acoustic wave device; (c) lead zirconate titanate (PZT), lead zirconate (PbZrO$_3$), lead lanthanum titanate (Pb,La)TiO$_3$), lead lanthanum zirconate titanate (PLZT), potassium niobate (KNbO$_3$), potassium niobate tantalate (K(Ta,Nb)O$_3$), barium titanate (BaTiO$_3$), and barium strontium titanate ((Ba,Sr)TiO$_3$), when the device is a pyroelectric device; (d) lead lanthanum titanate ((Pb,La)TiO$_3$), lead lanthanum zirconate ((Pb,La)ZrO$_3$), lead lanthanum zirconate titanate (PLZT), barium strontium titanate ((Ba,Sr)TiO$_3$), barium titanate zirconate (Ba(Ti,Zr)O$_3$), lead magnesium niobate and lead zinc niobate (Pb(Zn$_{\frac{1}{3}}$Nb$_{\frac{2}{3}}$)O$_3$), when the device is a thin-film capacitor device; (e) lead zirconate titanate (PZT), lead zirconate (PbZrO$_3$), lead lanthanum zirconate titanate (PLZT), lead lanthanum titanate ((Pb,La)TiO$_3$), lead lanthanum zirconate ((Pb,La)ZrO$_3$), potassium niobate (KNbO$_3$) and potassium tantalate niobate (K(Ta,Nb)O$_3$), barium titanate (BaTiO$_3$), and barium strontium titanate ((Ba,Sr)TiO$_3$), when the device is an optical waveguide device; (f) lead titanate (PbTiO$_3$), strontium titanate (SrTiO$_3$), and the second deposited layer is selected from the group consisting of potassium niobate (KNbO$_3$) and potassium tantalate niobate (K(Ta,Nb)O$_3$), when the device is a frequency-doubling (second harmonic generation) device; (g) potassium niobate (KNbO$_3$) and potassium tantalate niobate (K(Ta,Nb)O$_3$), or these materials doped with colloidal metal particles, when the device is a nonlinear optical device; (h) lead titanate (PbTiO$_3$), strontium titanate (SrTiO$_3$), and the second deposited layer is selected from the group consisting of lead lanthanum zirconate titanate (PLZT), lead lanthanum titanate ((Pb,La)TiO$_3$), lead lanthanum zirconate ((Pb,La)ZrO$_3$), potassium niobate (KNbO$_3$), and potassium tantalate niobate (K(Ta,Nb)O$_3$), when the device is a spatial light modulator device; (i) lead titanate (PbTiO$_3$) and strontium titanate (SrTiO$_3$), and the second deposited layer is selected from the group consisting of lead lanthanum zirconate titanate (PLZT), lead lanthanum titanate ((Pb,La)TiO$_3$), and lead lanthanum zirconate ((Pb,La)ZrO$_3$), potassium niobate (KNbO$_3$), and potassium tantalate niobate (K(Ta,Nb)O$_3$), when the device is an optical memory device; (j) and the second deposited layer is selected from the group consisting of lead zirconate titanate (PZT), lead zirconate (PbZrO$_3$), lead lanthanum titanate (PLT), lead lanthanum zirconate ((Pb,La)ZrO$_3$), lead lanthanum zirconate titanate (PLZT), lead magnesium niobate (Pb(Mg$_{\frac{1}{3}}$Nb$_{\frac{2}{3}}$)O$_3$), lead zinc niobate (Pb(Mg$_{\frac{1}{3}}$Nb$_{\frac{2}{3}}$)O$_3$), barium titanate (BaTiO$_3$), strontium barium titanate ((Sr,Ba)TiO$_3$), barium titanate zirconate (Ba(Ti,Zr)O$_3$), potassium niobate (KNbO$_3$), potassium tantalate (KTaO$_3$), and potassium tantalate niobate (K(Ta,Nb)O$_3$), when the device is a sensor device.

While the forms of the invention herein disclosed constitute presently preferred embodiments, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

We claim:

1. A method for producing a thin film of a ferroelectric perovskite material comprising:
   a. providing a first substrate;
   b. selecting a first sol-gel perovskite precursor material wherein the crystallization of the first sol-gel perovskite precursor material to the perovskite phase is insensitive to the first substrate and wherein after heat treatment the material is isostructural to the second ferroelectric perovskite thin-film material of step (g);
   c. depositing a first layer of the selected first sol-gel perovskite precursor material;
   d. heat-treating the first deposited layer to form a first ferroelectric perovskite thin-film material;
   e. selecting a second sol-gel perovskite precursor material wherein the crystallization of the second sol-gel perovskite precursor material to the perovskite phase is sensitive to the first substrate;
   f. depositing a second layer of the selected second sol-gel perovskite precursor material;
   g. heat-treating the second deposited layer to form a second ferroelectric perovskite thin-film material; and whereby the second layer of the second sol-gel perovskite precursor material after heat treatment has better perovskite crystallinity when deposited on the first layer than if the second layer had been deposited directly on the first substrate and heat treated.

2. The method of claim 1 wherein the first sol-gel perovskite precursor material is selected to produce a perovskite in step d of: lead titanate (PbTiO$_3$), or strontium titanate (SrTiO$_3$).

3. The method of claim 1 wherein the second sol-gel precursor material is selected to produce a perovskite in step g of: lead zirconate titanate (Pb(Zr,Ti)O$_3$ or PZT), lead zirconate (PbZrO$_3$), lead lanthanum titanate ((Pb,La)TiO$_3$), lead lanthanum zirconate ((Pb,La)ZrO$_3$), lead lanthanum zirconate titanate ((Pb,La)(Zr- ,Ti)O$_3$ or PLZT), lead magnesium niobate (Pb(Mg$_{\frac{1}{3}}$Nb$_{\frac{2}{3}}$)O$_3$), lead zinc niobate (Pb(Zn$_{\frac{1}{3}}$Nb$_{\frac{2}{3}}$)O$_3$), barium titanate (BaTiO$_3$), strontium barium titanate ((Sr,Ba)TiO$_3$), barium titanate zirconate (Ba(Ti,Zr)O$_3$), potassium niobate (KNbO$_3$), potassium tantalate (KTaO$_3$), or potassium tantalate niobate (K(Ta,Nb)O$_3$).

4. The method of claim 1 wherein the second layer of sol-gel perovskite precursor material densifies and crystallizes into a perovskite structure at a lower temperature and/or with shorter times in the presence of the first layer of sol-gel perovskite precursor material.

5. The method of claim 1, whereby the first layer of the selected first sol-gel perovskite precursor material and/or the second layer of the selected second sol-gel perovskite precursor material is deposited in multiple coatings.

6. The method of claim 5, comprising applying the multiple coatings to produce a compositional gradient from the first substrate/first layer interface to the surface of the second layer.

7. The method of claim 1, whereby the first sol-gel perovskite precursor material selected for the first layer has a constituent that is desired in the second layer and the composition of the second sol-gel perovskite precursor material selected for the second layer is adjusted to account for the constituent in the first layer.

8. A method for producing a thin film of a ferroelectric perovskite material comprising:
   a. providing a first substrate;
   b. selecting a first sol-gel perovskite precursor material wherein the crystallization of the first sol-gel perovskite precursor material to the perovskite phase is insensitive to the first substrate and wherein after heat treatment the material is isostructural to the second ferroelectric perovskite thin-film material of step (f);
   c. depositing a first layer of the first sol-gel perovskite precursor material;
   d. selecting a sol-gel perovskite precursor material wherein the crystallization of the second sol-gel perovskite precursor material is sensitive to the first substrate;
   e. depositing a second layer of the second sol-gel perovskite precursor material;
   f. heat-treating the deposited layers to form a first layer and a second layer of ferroelectric perovskite thin film material; and whereby the second layer of the selected second sol-gel perovskite precursor material after heat treatment has better perovskite crystallinity when deposited on the first layer than if the second layer had been deposited directly on the first substrate and heat treated.

9. The method of claim 8 wherein the first sol-gel perovskite precursor material is selected to produce a perovskite in step f of: lead titanate (PbTiO$_3$), or strontium titanate (SrTiO$_3$).

10. The method of claim 8 wherein the second sol-gel perovskite precursor material is selected to produce a perovskite in step f of: lead zirconate titanate (Pb(Zr,Ti)O$_3$), lead zirconate (PbZrO$_3$), lead lanthanum titanate ((Pb,La)TiO$_3$), lead lanthanum zirconate ((Pb,La)ZrO$_3$), lead lanthanum zirconate titanate ((Pb,La)(Zr,Ti)O$_3$), lead zinc niobate (Pb(Zn$_{\frac{1}{3}}$Nb$_{\frac{2}{3}}$)O$_3$), barium titanate (BaTiO$_3$), strontium barium titanate ((Sr,Ba)TiO$_3$), barium titanate zirconate (Ba(Ti,Zr)O$_3$), potassium niobate (KNbO$_3$), potassium tantalate (KTaO$_3$), or potassium tantalate niobate (K(Ta,Nb)O$_3$).

11. The method of claim 8 whereby the second layer of sol-gel perovskite precursor material densifies and crystallizes into a perovskite structure at a lower temperature and/or with shorter times in the presence of the first layer of sol-gel perovskite precursor material.

12. The method of claim 8, whereby the first layer of the selected first sol-gel perovskite precursor material and/or the second layer of the selected second sol-gel perovskite precursor material is deposited in multiple coatings.

13. The method of claim 12, comprising applying the multiple coatings to produce a compositional gradient from the first substrate/first layer interface to the surface of the second layer.

14. The method of claim 8, whereby the first sol-gel perovskite precursor material selected for the first layer has a constituent that is desired in the second layer and the composition of the second sol-gel perovskite precursor material selected for the second layer is adjusted to account for the constituent in the first layer.

15. A method for producing a thin film of a ferroelectric perovskite material comprising:
   a. providing a first substrate selected from the group consisting of fused silica (SiO$_2$), silicon (Si), gallium arsenide (GaAs), alumina (Al$_2$O$_3$), sapphire (single crystal Al$_2$O$_3$), or any of the above substrates coated with platinum, gold, indium tin oxide, F-doped tin oxide, or any other material with metallic conductivity;
   b. depositing a first layer of a sol-gel perovskite precursor material of PbTiO$_3$, or SrTiO$_3$;
   c. heat-treating the first deposited layer to form a perovskite thin film material;
   d. depositing a second layer of a sol-gel perovskite precursor material of: lead zirconate titanate (Pb(Zr,Ti)O$_3$ or PZT), lead zirconate (PbZrO$_3$), lead lanthanum titanate ((Pb,La)TiO$_3$), lead lanthanum zirconate ((Pb,La)ZrO$_3$), lead lanthanum zirconate titanate ((Pb,La)(Zr,Ti)O$_3$ or PLZT), lead magnesium niobate (Pb(Mg$_{\frac{1}{3}}$Nb$_{\frac{2}{3}}$)O$_3$), lead zinc niobate (PbZn($_{\frac{1}{3}}$Nb$_{\frac{2}{3}}$)O$_3$), barium titanate (BaTiO$_3$), strontium barium titanate ((Sr,Ba)TiO$_3$), barium titanate zirconate (Ba(Ti,Zr)O$_3$), potassium niobate (KNbO$_3$), potassium tantalate (KTaO$_3$), and potassium tantalate niobate (K(Ta,Nb)O$_3$);
   e. heat-treating the second deposited layer to form a perovskite material; and whereby the second layer of sol-gel perovskite precursor material after heat treatment has better perovskite crystallinity when deposited on the first layer than if it had been deposited directly on the first substrate and heat treated.

16. The method of claim 15 whereby the second layer of sol-gel perovskite precursor material densifies and crystallizes into a perovskite structure at a lower temperature in the presence of the first layer.

17. The method of claim 15, whereby the first layer of a sol-gel perovskite precursor material and/or the second layer of sol-gel perovskite precursor material is deposited in multiple coatings.

18. The method of claim 17, comprising applying the multiple coatings to produce a compositional gradient from the substrate/first layer interface to the surface of the second layer.

19. The method of claim 15, whereby the first sol-gel perovskite precursor material selected for the first layer has a constituent that is desired in the second layer and the composition of the second sol-gel perovskite precursor material selected for the second layer is adjusted to account for the constituent in the first layer.

20. A method for producing a thin film of a ferroelectric perovskite material comprising:
   a. providing a first substrate selected from the group consisting of fused silica ($SiO_2$), silicon (Si), gallium arsenide (GaAs), alumina ($Al_2O_3$), sapphire (single crystal $Al_2O_3$), or any of the above substrates coated with platinum, gold, indium tin oxide, F-doped tin oxide, or any other material with metallic conductivity;
   b. depositing a first layer of a sol-gel perovskite precursor material of $PbTiO_3$, or $SrTiO_3$;
   c. depositing a second layer of a sol-gel perovskite precursor material of lead zirconate titanate ($Pb(Zr,Ti)O_3$ or PZT), lead zirconate ($PbZrO_3$), lead lanthanum titanate (($Pb,La)TiO_3$), lead lanthanum zirconate (($Pb,La)ZrO_3$), lead lanthanum zirconate titanate (($Pb,La)(Zr,Ti)O_3$ or PLZT), lead magnesium niobate ($Pb(Mg_{\frac{1}{3}}Nb_{\frac{2}{3}})O_3$) lead zinc niobate ($Pb(Zn_{\frac{1}{3}}Nb_{\frac{2}{3}})O_3$) barium titanate ($BaTiO_3$), strontium barium titanate (($Sr,Ba)TiO_3$), barium titanate zirconate ($Ba(Ti,Zr)O_3$), potassium niobate ($KNbO_3$), potassium tantalate ($KTaO_3$), or potassium tantalate niobate ($K(Ta,Nb)O_3$);
   d. heat-treating the deposited layers to form a perovskite thin film material; and whereby the second layer of sol-gel perovskite precursor material after heat treatment has better perovskite crystallinity when deposited on the first layer than if it had been deposited directly on the first substrate and heat treated.

21. The method of claim 20 whereby the second layer of sol-gel perovskite precursor material densifies and crystallizes into a perovskite structure at a lower temperature and/or with shorter times in the presence of the first layer.

22. The method of claim 20, whereby the first layer of a sol-gel perovskite precursor material and/or the second layer of a sol-gel perovskite precursor material is deposited in multiple coatings.

23. The method of claim 22, comprising applying the multiple coatings to produce a compositional gradient from the substrate/first layer interface to the surface of the second layer.

24. The method of claim 20, whereby the first sol-gel perovskite precursor material selected for the first layer has a constituent that is desired in the second layer and the composition of the second sol-gel perovskite precursor material selected for the second layer is adjusted to account for the constituent in the first layer.

* * * * *

UNITED STATES PATENT AND TRADEMARK OFFICE
CERTIFICATE OF CORRECTION

PATENT NO. : 5,198,269
DATED : March 30, 1993
INVENTOR(S) : Scott L. Swartz and Peter J. Melling It is certified that error appears in the above-identified patent and that said Letters Patent is hereby corrected as shown below:

Column 1, line 50, "$(Pb(Mg_{1/3}Nb_{170})O_3)$," should be --$(Pb(Mg_{1/3}Nb_{2/3})O_3)$,--.

Column 1, line 50, "$(Pb(Zn_{1/3}Nb_{170}$" should be --$(Pb(Zn_{1/3}Nb_{2/3}$--.

Column 1, line 54, "$(KNbO_3)$." should be --$(KNbO_3)$,--.

Column 2, line 3, "407-40g" should be --407-409--.

Column 2, line 49, "thin." should be --thin,--.

Column 3, line 57, "perovskite: of" should be --perovskite of:--.

Column 3, line 62, "$(Pb(Zn_{1/3}Nb_{170})O_3)$," should be --$(Pb(Zn_{1/3}Nb_{2/3})O_3)$,--.

Column 5, line 12, "(b)," should be --(b)--.

Column 5, line 65, "zirconatetitanate" should be --zirconate titanate--.

Column 5, line 67, "leadlanthanum" should be --lead lanthanum--.

Column 7, line 17, "butcrystallized" should be --but crystallized--.

Column 11, line 49, "1.761" should be --1.761 Å,--.

Column 19, line 22, "spatiallight" should be --spatial light--.

Column 19, line 27, "independent" should be --insensitive--.

UNITED STATES PATENT AND TRADEMARK OFFICE
CERTIFICATE OF CORRECTION

PATENT NO. : 5,198,269
DATED : March 30, 1993
INVENTOR(S) : Scott L. Swartz and Peter J. Melling It is certified that error appears in the above—identified patent and that said Letters Patent is hereby corrected as shown below:

Column 19, line 28, "of" should be --to--.

Column 19, line 47 "niobate and" should be --niobate $(Pb(Mg_{1/3}Nb_{2/3})O_3)$, and--.

Column 21, line 7, "wherein" should be --whereby--.

Column 21, line 64, "$((Pb,La)(Zr,Ti)O_3)$, lead" should be --$((Pb,La)(Zr,Ti)O_3)$, lead magnesium niobate $(Pb(Mg_{1/3}Nb_{2/3})O_3)$, lead--.

Column 22, line 59, "of sol-gel" should be --of a sol-gel--.

Signed and Sealed this

Twenty-second Day of February, 1994

Attest:

BRUCE LEHMAN

*Attesting Officer*  *Commissioner of Patents and Trademarks*